(12) United States Patent
Huang et al.

(10) Patent No.: US 10,401,594 B2
(45) Date of Patent: Sep. 3, 2019

(54) CAMERA LENS ASSEMBLY AND CAMERA DEVICE EQUIPPED WITH CAMERA LENS ASSEMBLY

(71) Applicant: Zhejiang Sunny Optical Co., Ltd, Ningbo (CN)

(72) Inventors: Lin Huang, Ningbo (CN); Fujian Dai, Ningbo (CN)

(73) Assignee: Zhejiang Sunny Optical Co., Ltd. (CN)

( * ) Notice: Subject to any disclaimer, the term of this patent is extended or adjusted under 35 U.S.C. 154(b) by 0 days.

(21) Appl. No.: 15/566,970

(22) PCT Filed: Nov. 14, 2016

(86) PCT No.: PCT/CN2016/105629
§ 371 (c)(1),
(2) Date: Oct. 16, 2017

(87) PCT Pub. No.: WO2018/058754
PCT Pub. Date: Apr. 5, 2018

(65) Prior Publication Data
US 2018/0292628 A1    Oct. 11, 2018

(30) Foreign Application Priority Data
Sep. 30, 2016    (CN) .......................... 2016 1 0870663

(51) Int. Cl.
| | |
|---|---|
| *G02B 13/18* | (2006.01) |
| *G02B 3/02* | (2006.01) |
| *G02B 13/00* | (2006.01) |
| *G02B 9/60* | (2006.01) |
| *G02B 13/02* | (2006.01) |

(52) U.S. Cl.
CPC ........... *G02B 13/0045* (2013.01); *G02B 9/60* (2013.01); *G02B 13/0015* (2013.01); *G02B 13/02* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 2003/0123157 A1 | 7/2003 | Nishimura | |
| 2011/0249347 A1 | 10/2011 | Kubota | |
| 2014/0293448 A1* | 10/2014 | Kanda | ................ G02B 13/0045 359/714 |

FOREIGN PATENT DOCUMENTS

| | | |
|---|---|---|
| CN | 104913224 A | 9/2015 |
| CN | 105511056 A | 4/2016 |
| CN | 105739060 A | 7/2016 |

(Continued)

*Primary Examiner* — Alicia M Harrington
(74) *Attorney, Agent, or Firm* — Barnes & Thornburg LLP

(57) ABSTRACT

The present application discloses a camera lens assembly and a camera device equipped with the camera lens assembly. The camera lens assembly includes: a first lens adjacent to an object side and having positive focal power and multiple subsequent lenses arranged in sequence from the first lens to an image side along an optical axis, where the focal power of the first lens satisfies the following formula: $2.0<f/f1<3.0$, where f is a total effective focal length jointly determined by the first lens and the multiple subsequent lenses, and f1 is an effective focal length of the first lens. The camera lens assembly has telephoto function and can meet the users' requirements for higher image quality and miniaturization.

14 Claims, 21 Drawing Sheets

(56) References Cited

FOREIGN PATENT DOCUMENTS

CN         105842827 A     8/2016
CN         205581382 U     9/2016

\* cited by examiner

CAMERA LENS ASSEMBLY AND CAMERA DEVICE EQUIPPED WITH CAMERA LENS ASSEMBLY

CROSS-REFERENCE TO RELATED APPLICATIONS

This application is a U.S. national counterpart application of international application serial No. PCT/CN2016/105629 filed Nov. 14, 2016, which claims priority to Chinese Patent Application No. 201610870663.8, filed Sep. 30, 2016.

CROSS-REFERENCE TO RELATED APPLICATION

This application is related to and claims priority from Chinese Patent Application No. 201610870663.8, filed with the State Intellectual Property Office (SIPO) of the P.R.C. on Sep. 30, 2016, the entire disclosure of which is hereby incorporated by reference.

TECHNICAL FIELD

The present application relates to a camera lens assembly and a camera device equipped with the camera lens assembly.

BACKGROUND

As charge-coupled device (CCD) and complementary metal-oxide semiconductor (CMOS) image sensors are having increasingly higher performance and smaller size, camera lens assemblies also need to meet the requirements for higher image quality and miniaturization.

To achieve miniaturization, the number of lenses in an imaging lens assembly needs to be reduced as much as possible. However, this may lead to a lack of design freedom, making it difficult to meet the requirements for high imaging performance on the market. Currently, in a common five-lens optical system, the image-side surface of the fourth lens mostly has a convex shape, and the lens thickness changes noticeably, which is not conducive to lens forming and easily makes the optical system unduly sensitive, as shown in Patent Application No. CN200980150188.5. In addition, to obtain a broad view image, currently mainstream camera lens assemblies adopt a wide-angle optical system, which, however, is not suitable for photographing a distant object and cannot obtain a clear image. Therefore, there is a need to provide a high-quality miniature camera lens assembly having telephoto function and a camera device equipped with the camera lens assembly.

SUMMARY

The technical solutions provided in the present application solve at least some of the above-mentioned technical problems.

According to an aspect, the present application provides a camera lens assembly. The camera lens assembly comprises: a first lens adjacent to an object side and having positive focal power and multiple subsequent lenses arranged in sequence from the first lens to an image side along an optical axis, wherein the focal power of the first lens satisfies the following formula: $2.0 < f/f1 < 3.0$, wherein f is a total effective focal length jointly determined by the first lens and the multiple subsequent lenses, and f1 is an effective focal length of the first lens. For example, $2.01 \leq f/f1 \leq 2.98$.

According to an implementation of the present application, the total effective focal length f and ImgH, ImgH being half a diagonal length of an effective pixel area of a photosensitive component, satisfy the following formula: $ImgH/f < 0.35$, for example, $ImgH/f \leq 0.30$, wherein the photosensitive component is disposed on an image plane jointly determined by the first lens and the multiple subsequent lenses.

According to an implementation of the present application, the multiple subsequent lenses comprise a second lens, a third lens, a fourth lens, and a fifth lens arranged in sequence from the first lens to the image side, wherein the second lens has negative focal power and an object-side surface of the second lens is a concave surface; an image-side surface of the fourth lens is a concave surface; and the fifth lens has negative focal power.

According to an implementation of the present application, on the optical axis, an air spacing T12 between the first lens and the second lens, an air spacing T23 between the second lens and the third lens, an air spacing T34 between the third lens and the fourth lens, and an air spacing T45 between the fourth lens and the fifth lens satisfy: $0.8 \leq T45/(T12+T23+T34) < 4.5$, for example, $0.81 \leq T45/(T12+T23+T34) \leq 4.39$.

According to an implementation of the present application, a maximum effective radius SD11 of an object-side surface of the first lens and a maximum effective radius SD52 of an image-side surface of the fifth lens satisfy: $1 \leq SD11/SD52 < 1.5$, for example, $1.04 \leq SD11/SD52 \leq 1.48$.

According to an implementation of the present application, an effective focal length f2 of the second lens satisfies: $-1.0 < f1/f2 < 0$, for example, $-0.72 \leq f1/f2 \leq -0.02$.

According to an implementation of the present application, an effective focal length f5 of the fifth lens satisfies: $-0.5 < f1/f5 < 0$, for example, $-0.42 \leq f1/f5 - 0.13$.

According to an implementation of the present application, a center thickness CT1 of the first lens and a center thickness CT2 of the second lens satisfy: $1 < CT1/CT2 < 2$, for example, $1.03 \leq CT1/CT2 \leq 1.82$.

According to an implementation of the present application, a center thickness CT3 of the third lens, a center thickness CT4 of the fourth lens, and a center thickness CT5 of the fifth lens satisfy: $0.2 \leq CT5/(CT3+CT4) < 1.0$, for example, $0.20 \leq CT5/(CT3+CT4) \leq 0.80$.

According to an implementation of the present application, a dispersion coefficient V2 of the second lens, a dispersion coefficient V3 of the third lens, and a dispersion coefficient V4 of the fourth lens satisfy: $30 < (V2+V3+V4)/3 < 40$, for example, $34.39 \leq (V2+V3+V4)/3 \leq 35.07$.

According to an implementation of the present application, a radius of curvature R1 of an object-side surface of the first lens and a radius of curvature R2 of an image-side surface of the second lens satisfy: $-1.5 < R1/R2 < -0.5$, for example, $-1.40 \leq R1/R2 \leq -0.56$.

According to an implementation of the present application, an object-side surface of the third lens is a convex surface and an image-side surface of the third lens is a concave surface. In addition, an object-side surface of the fourth lens is a convex surface.

According to another aspect, the present application provides a camera device, equipped with the camera lens assembly described above.

The camera lens assembly and the camera device according to the implementations of the present application have telephoto function and can meet the users' requirements for higher image quality and miniaturization.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION OF EMBODIMENTS

Figure 1:
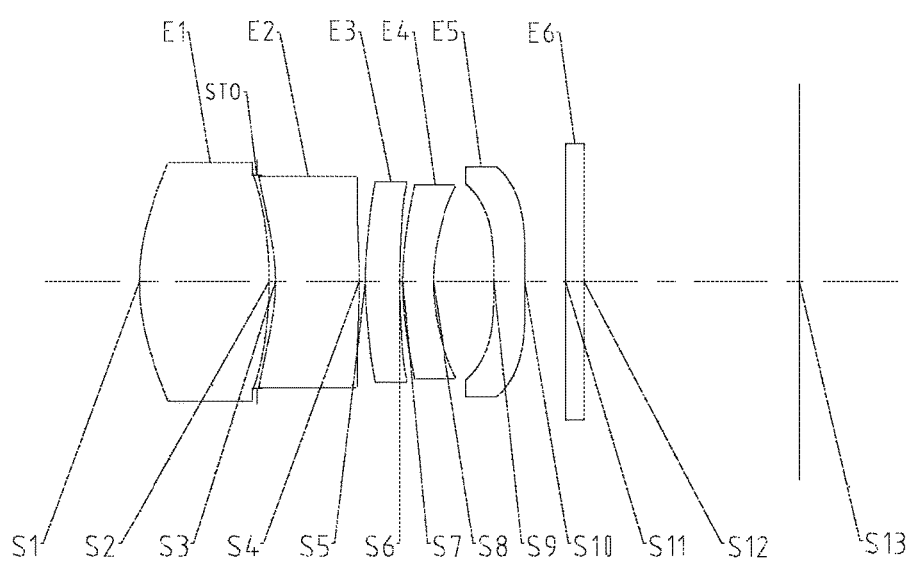
FIG. 1 is a schematic structural diagram of a camera lens assembly according to Embodiment 1.

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It will be understood that in the present application, when an element or layer is referred to as being "on," "connected to" or "coupled to" another element or layer, it can be directly on, connected or coupled to the other element or layer or intervening elements or layers may be present. By contrast, when an element is referred to as being "directly on," "directly connected to" or "directly coupled to" another element or layer, there are no intervening elements or layers present. The same reference numerals designate the same elements throughout this specification. As used herein, the term "and/or" includes any and all combinations of one or more of the associated listed items.

It will be understood that, although terms such as "first" and "second" may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above" and "upper" may be used herein for ease of description to describe one element or feature's relation to other element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below.

The terminology used herein is for the purpose of describing particular embodiments only and is not intended to be limiting of the present application. As used herein, the singular forms "a," "an" and "the" are intended to include the plural forms as well, unless the context clearly indicates otherwise. It will be further understood that the terms "comprising," "including," "having" and variants thereof, when used in this specification, specify the presence of stated features, steps, operations, elements and/or components, but do not preclude the presence or addition of one or more other features, steps, operations, elements, components and/or groups thereof. As used herein, the term "and/or" includes any and all combinations of one or more of the associated listed items. Expressions, such as "at least one of," when preceding a list of elements, modify the entire list of elements rather than an individual element in the list. Further, the use of "may", when describing embodiments of the present application, relates to "one or more embodiments of the present application." Also, the term "exemplary" is intended to refer to an example or illustration.

As used herein, the terms "substantially," "about" and similar terms are used as a term of approximation and not as a term of degree, and are intended to account for the inherent deviations in measured or calculated values that would be recognized by those of ordinary skill in the art.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present application and the features in the embodiments may be combined with each other on a non-conflict basis. The present application will be described below in detail with reference to the accompanying drawings and in combination with the embodiments.

The present application will be further described below in combination with specific embodiments.

Embodiment 1

First, a camera lens assembly according to Embodiment 1 of the present application is described with reference to FIG. 1 to FIG. 2D.

FIG. 1 is a schematic structural diagram of a camera lens assembly according to Embodiment 1 of the present application. The camera lens assembly may include: a first lens (having an effective focal length f1) adjacent to an object side and having positive focal power and multiple subsequent lenses arranged in sequence from the first lens to an image side along an optical axis. A total effective focal length f is jointly determined by the first lens and the multiple subsequent lenses. The focal power of the first lens satisfies the following formula: $2.0 < f/f1 < 3.0$, for example, $2.01 \leq f/f1 \leq 2.98$. In this embodiment, $f/f1=2.44$. By reasonably setting the relation between the effective focal length f1 of the first lens and the total effective focal length f of the camera lens assembly, the aberration of the camera lens assembly can be effectively reduced while achieving telephoto function, thereby ensuring excellent resolution performance.

In this embodiment, the total effective focal length f and ImgH, ImgH being half a diagonal length of an effective pixel area of a photosensitive component, satisfy the following formula: $ImgH/f < 0.35$, where the photosensitive component is disposed on an image plane jointly determined by the first lens and the multiple subsequent lenses. Specifically, $ImgH/f \leq 0.30$. For example, in this embodiment, $ImgH/f=0.30$. In an optical system, provided that the image height is fixed, an excessively long total effective focal length f produces a large negative distortion, and an excessively short total effective focal length f leads to poor manufacturability and makes it difficult to ensure the brightness on the edge of the image plane. Setting the total effective focal length of the camera lens assembly by using the above-mentioned formula can balance the distortion and the machinability while achieving a telephoto effect.

In this embodiment, the multiple subsequent lenses E2-E5 include a second lens E2, a third lens E3, a fourth lens E4, and a fifth lens E5 arranged in sequence from the first lens E1 to the image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

In this embodiment, the second lens E2 has negative focal power and the object-side surface S3 is a concave surface; the object-side surface S5 of the third lens E3 is a convex surface and the image-side surface S6 is a concave surface; the object-side surface S7 of the fourth lens E4 is a convex surface and the image-side surface S8 is a concave surface; and the fifth lens E5 has negative focal power. By reasonably setting the surface forms of the lenses, the design sensitivity of the optical system is effectively reduced, and the processing stability is ensured.

In this embodiment, axial spacings between the lenses may further be optimized. For example, on the optical axis, an air spacing T12 between the first lens E1 and the second lens E2, an air spacing T23 between the second lens E2 and the third lens E3, an air spacing T34 between the third lens E3 and the fourth lens E4, and an air spacing T45 between the fourth lens E4 and the fifth lens E5 may be set in such a manner that 0.8≤T45/(T12+T23+T34)<4.5, for example, 0.81≤T45/(T12+T23+T34)≤4.39. In this embodiment, T45/(T12+T23+T34)=1.02. By reasonably optimizing the axial spacings between the lenses, the aberration of the camera lens assembly can be further reduced, thereby ensuring excellent resolution performance.

In this embodiment, the thicknesses of the lenses may further be optimized. For example, a center thickness CT1 of the first lens E1 and a center thickness CT2 of the second lens E2 may satisfy: 1<CT1/CT2<2, for example, 1.03≤CT1/CT2≤1.82. In this embodiment, CT1/CT2=1.56. The overall focal length is reasonably distributed by means of the cooperation of the center thicknesses of the first lens E1 and the second lens E2, thereby achieving better telephoto function.

In addition, a center thickness CT3 of the third lens E3, a center thickness CT4 of the fourth lens E4, and a center thickness CT5 of the fifth lens E5 may satisfy: 0.2≤CT5/(CT3+CT4)<1.0, for example, 0.20≤CT5/(CT3+CT4)≤0.80. In this embodiment, CT5/(CT3+CT4)=0.47. By reasonably distributing the center thicknesses of the three lenses, the effective aperture of the fifth lens can be effectively reduced. This helps reduce the chief ray angle and ensure the processing and assembling stability.

Table 1 given below shows the effective focal lengths f1 to f5 of the lenses, the total effective focal length f of the camera lens assembly, and a total track length TTL and a half field-of-view (diagonal) angle HFOV of the camera lens according to Embodiment 1.

TABLE 1-continued

| f3(mm) | 17.52 | HFOV(deg) | 16.41 |
| f4(mm) | −13.71 | | |
| f5(mm) | −21.61 | | |

According to Table 1, in this embodiment, the effective focal length f2 of the second lens E2 satisfies: −1.0<f1/f2<0, for example, −0.72≤f1/f2≤−0.02. In this embodiment, f1/f2=−0.64. The focal length distribution of the first lens E1 and the second lens E2 ensures the positive focal power and helps achieve the telephoto function.

In addition, the effective focal length f5 of the fifth lens E5 satisfies: −0.5<f1/f5<0, for example, −0.42≤f1/f5≤−0.13. In this embodiment, f1/f5=−0.20. By reasonably setting the effective focal lengths of the first lens E1 and the fifth lens E5, the telephoto function can be achieved while effectively reducing the distortion of the camera lens assembly, thereby improving the image quality of the camera lens assembly.

In this embodiment, at least one of the surfaces S1-S10 is an aspheric mirror surface. An aspheric lens is characterized in that its curvature continuously changes from the lens center to the periphery. Different from a spherical lens having a certain curvature from the lens center to the periphery, an aspheric lens has a better radius-of-curvature characteristic, has the advantages of reducing the distortion aberration and the astigmatism aberration, and can make the field of view wider and realer. The use of an aspheric lens can eliminate as much as possible the aberration that occurs during imaging, thereby improving the image quality.

In this embodiment, as an example, five lenses are used. By reasonably distributing the focal length and the surface form of each lens, the aberration of the camera lens assembly is effectively reduced and excellent resolution performance is achieved while ensuring the miniaturization of the camera lens assembly. The surface form of each aspheric mirror surface is defined by the following formula:

$$Z = ch^2/[1+\{1-(1+k)c^2h^2\}^{1/2}] + A_4h^4 + A_6h^6 + A_8h^8 + A_{10}h^{10} + A_{12}h^{12} + A_{14}h^{14} + A_{16}h^{16}$$

where, Z is a distance to a tangent plane at the vertex of the mirror surface, c is a paraxial curvature of the mirror surface, h is a height to the primary optical axis, k is a conic coefficient, and $A_4$ to $A_{16}$ are corresponding high-order coefficients. Table 2 below shows high-order coefficients $A_4$, $A_6$, $A_8$, $A_{10}$, $A_{12}$ and $A_{16}$ that can be applied to the aspheric mirror surfaces S1-S10 in Embodiment 1.

TABLE 2

| surface number | A4 | A6 | A8 | A10 | A12 | A14 | A16 |
| --- | --- | --- | --- | --- | --- | --- | --- |
| S1 | −1.4699E−03 | −6.2976E−04 | 5.7528E−05 | −7.0074E−05 | 1.3191E−05 | −1.8551E−06 | 6.5108E−08 |
| S2 | −5.0615E−03 | −2.6652E−03 | 6.1013E−04 | −2.5098E−04 | 1.1428E−04 | −2.4956E−05 | 1.9563E−06 |
| S3 | 6.0277E−03 | −8.0540E−04 | −2.2072E−04 | 1.2513E−04 | −1.2620E−05 | 5.0341E−08 | −9.1161E−08 |
| S4 | 1.1573E−02 | 1.1142E−03 | −9.9419E−04 | 3.3268E−04 | −6.2506E−05 | −5.0740E−07 | −2.3707E−07 |
| S5 | −1.7300E−02 | 8.8765E−03 | −4.6315E−03 | 2.1062E−03 | −3.1507E−04 | −5.2338E−06 | −3.9139E−15 |
| S6 | −2.0908E−02 | 1.1299E−02 | −9.9063E−03 | 5.6324E−03 | −1.0901E−03 | 2.8827E−06 | −2.4886E−15 |
| S7 | −2.1784E−02 | 1.9194E−02 | −1.1495E−02 | 5.4599E−03 | −1.1329E−03 | −2.5990E−14 | 1.3844E−15 |
| S8 | −5.2261E−02 | 2.5301E−02 | −8.0334E−03 | 2.4426E−03 | −4.2342E−04 | −8.8516E−15 | 2.2412E−16 |
| S9 | −7.7045E−02 | 1.4372E−03 | 1.2721E−02 | −1.1524E−02 | 5.1598E−03 | −1.2246E−03 | 1.0957E−04 |
| S10 | −6.3515E−02 | 1.1758E−02 | −2.0162E−03 | 1.8968E−04 | −1.4166E−04 | 5.1392E−05 | −7.3137E−06 |

TABLE 1

| f1(mm) | 4.38 | f(mm) | 10.70 |
| f2(mm) | −6.84 | TTL(mm) | 10.73 |

The performance of the camera lens assembly of the present application may be optimized by further setting the radius of curvature of each lens. As an example, Table 3 below specifically shows a surface form, radius of curvature, thickness, material and conic coefficient of each lens in a specific implementation of Embodiment 1.

TABLE 3

| surface number | surface form | radius of curvature | thickness | material | conic coefficient |
|---|---|---|---|---|---|
| OBJ | spherical | infinite | infinite | | |
| S1 | aspheric | 3.5315 | 2.1125 | 1.544, 56.11 | −0.5996 |
| S2 | aspheric | −5.8206 | −0.2012 | | −30.8693 |
| STO | spherical | infinite | 0.3029 | | 0.0000 |
| S3 | aspheric | −3.1496 | 1.3567 | 1.64, 23.53 | −11.5340 |
| S4 | aspheric | −12.9000 | 0.1 00 | | 1.9885 |
| S5 | aspheric | 5.4936 | 0.5566 | 1.64, 23.53 | −17.6833 |
| S6 | aspheric | 10.2731 | 0.0500 | | 33.7267 |
| S7 | aspheric | 4.8393 | 0.5000 | 1.544, 56.11 | −8.3553 |
| S8 | aspheric | 2.8317 | 0.9867 | | 0.2686 |
| S9 | aspheric | −26.8143 | 0.5000 | 1.544, 56.11 | 50.0000 |
| S10 | aspheric | 21.2026 | 0.6631 | | 21.691 |
| S11 | spherical | infinite | 0.3000 | 1.517, 64.17 | 0.0000 |
| S12 | spherical | infinite | 3.5000 | | 0.0000 |
| S13 | spherical | infinite | | | |

According to Table 3, in this embodiment, a radius of curvature R1 of the object-side surface S1 of the first lens E1 and a radius of curvature R2 of the image-side surface S4 of the second lens E2 satisfy: −1.5<R1/R2<−0.5, for example, −1.40≤R1/R2≤−0.56. In this embodiment, R1/R2=−0.61. By adjusting the radius of curvature of the first lens E1 and the radius of curvature of the second lens E2, the effective focal length distribution in the front-rear direction is effectively balanced, thereby achieving the telephoto function.

In addition, setting of a dispersion coefficient of each lens may further be optimized. For example, a dispersion coefficient V2 of the second lens E2, a dispersion coefficient V3 of the third lens E3 and a dispersion coefficient V4 of the fourth lens E4 may be set in such a manner that 30<(V2+V3+V4)/3<40, for example, 34.39≤(V2+V3+V4)/3≤35.07. In this embodiment, (V2+V3+V4)/3=34.39. By optimizing the setting of the dispersion coefficients of the above-mentioned three lenses, different combinations of different optical materials are achieved, thereby effectively reducing the chromatic aberration of the optical system and improving the resolution of the camera lens assembly.

In this embodiment, setting of a specific effective radius of the mirror surface of each lens may be optimized. For example, a maximum effective radius SD11 of the object-side surface S1 of the first lens E1 and a maximum effective radius SD52 of the image-side surface S10 of the fifth lens E5 may be set in such a manner that 1≤SD11/SD52<1.5, for example, 1.04≤SD11/SD52≤1.48. In this embodiment, SD11/SD52=1.04. This is for the purpose of effectively controlling the structural dimension of the optical system, facilitating the assembling process of the camera lens assembly, and ensuring the quality of the camera lens assembly.

Figure 2A:
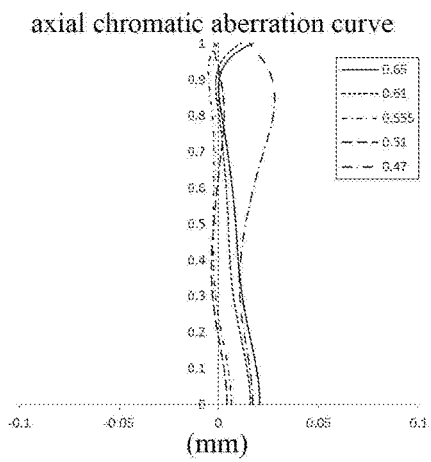
FIG. 2A illustrates an axial chromatic aberration curve of the camera lens assembly according to Embodiment 1.
Figure 2B:
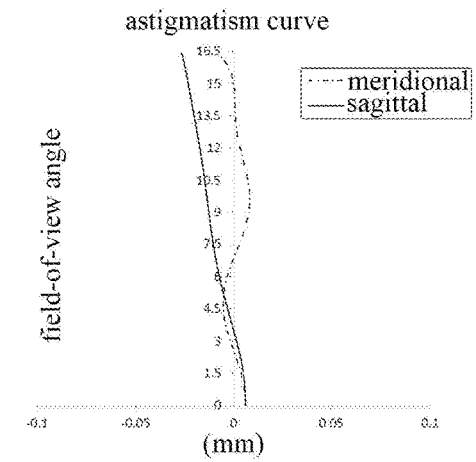
FIG. 2B illustrates an astigmatism curve of the camera lens assembly according to Embodiment 1.
Figure 2C:
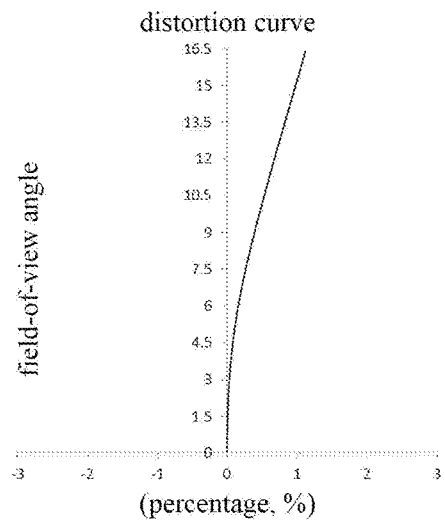
FIG. 2C illustrates a distortion curve of the camera lens assembly according to Embodiment 1.
Figure 2D:
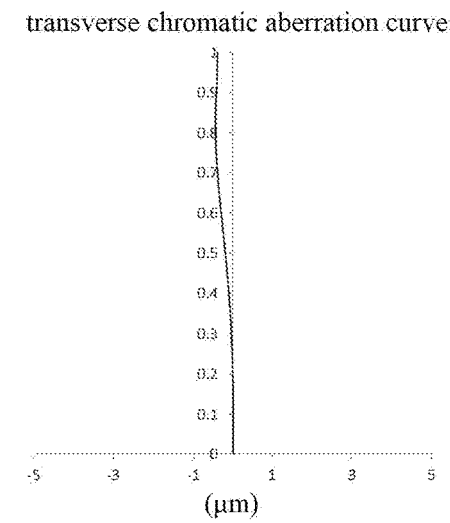
FIG. 2D illustrates a transverse chromatic aberration curve of the camera lens assembly according to Embodiment 1.

FIG. 2A illustrates an axial chromatic aberration curve of the camera lens assembly according to Embodiment 1, representing deviations of focal points of light of different wavelengths converged after passing through an optical system. FIG. 2B illustrates an astigmatism curve of the camera lens assembly according to Embodiment 1, representing a curvature of a meridional image plane and a curvature of a sagittal image plane. FIG. 2C illustrates a distortion curve of the camera lens assembly according to Embodiment 1, representing amounts of distortion at different viewing angles. FIG. 2D illustrates a transverse chromatic aberration curve of the camera lens assembly according to Embodiment 1, representing deviations of different image heights on an image plane after light passes through the camera lens assembly. It can be seen from FIG. 2A to FIG. 2D that the camera lens assembly provided in Embodiment 1 achieves good image quality.

Embodiment 2

Figure 3:
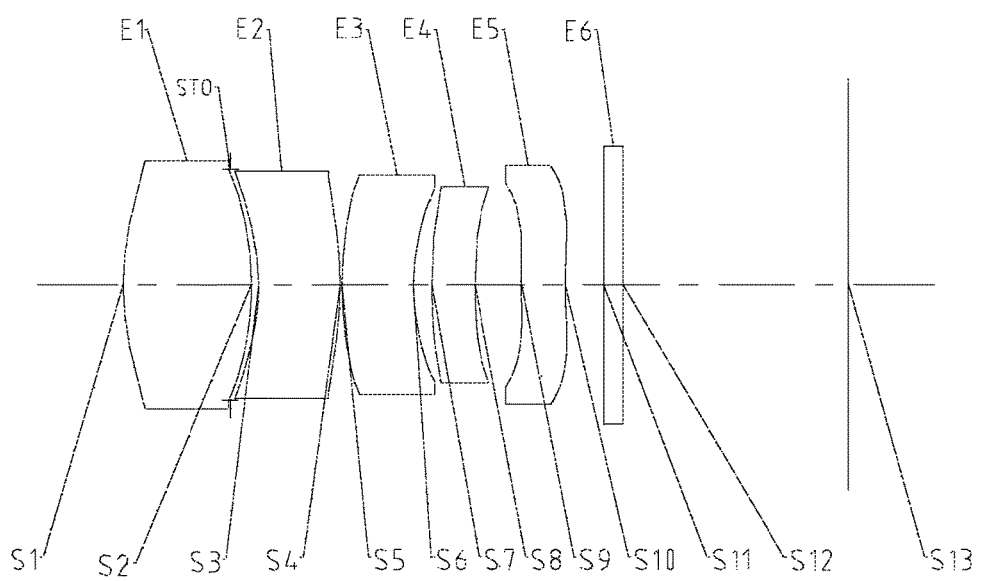
FIG. 3 is a schematic structural diagram of a camera lens assembly according to Embodiment 2.

A camera lens assembly according to Embodiment 2 of the present application is described below with reference to FIG. 3 to FIG. 4D. In this embodiment and the following embodiments, for the purpose of brevity, the description of parts similar to those in Embodiment 1 will be omitted. FIG. 3 is a schematic structural diagram of a camera lens assembly according to Embodiment 2.

As shown in FIG. 3, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 4 shows a surface form, radius of curvature, thickness, material and conic coefficient of each lens in Embodiment 2. Table 5 shows a high-order coefficient of each aspheric mirror surface in Embodiment 2. Table 6 shows the effective focal lengths f1 to f5 of the lenses, the total effective focal length f of the camera lens assembly, and a total track length TTL and a half field-of-view angle HFOV of the camera lens according to Embodiment 2.

TABLE 4

| surface number | surface form | radius of curvature | thickness | material | conic coefficient |
|---|---|---|---|---|---|
| OBJ | spherical | infinite | infinite | | |
| S1 | aspheric | 4.5612 | 1.9926 | 1.544, 56.11 | −0.8328 |
| S2 | aspheric | −4.8937 | −0.3265 | | −12.4067 |
| STO | spherical | infinite | 0.4406 | | 0.0000 |
| S3 | aspheric | −3.1705 | 1.2597 | 1.635, 23.78 | −7.3096 |
| S4 | aspheric | −5.4441 | 0.0265 | | 2.5111 |
| S5 | aspheric | 5.1488 | 1.1055 | 1.544, 56.11 | 6.1176 |
| S6 | aspheric | 3.0217 | 0.2890 | | 1.5397 |
| S7 | aspheric | 10.9073 | 0.6670 | 1.64, 23.53 | 24.8082 |
| S8 | aspheric | 8.4012 | 0.7249 | | 22.0996 |
| S9 | aspheric | 11.1420 | 0.6781 | 1.544, 56.11 | −75.1181 |
| S10 | aspheric | 6.2430 | 0.5934 | | −4.4022 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 5

| surface number | A4 | A6 | A8 | A10 | A12 | A14 | A16 |
|---|---|---|---|---|---|---|---|
| S1 | −2.8193E−03 | −4.3875E−04 | −4.7932E−05 | −2.2857E−06 | 2.4684E−06 | −8.7485E−07 | 6.7856E−08 |
| S2 | −9.1169E−03 | 8.8396E−04 | −9.9896E−04 | 2.9011E−04 | −2.1325E−05 | 9.3324E−07 | −5.1709E−07 |
| S3 | 3.7935E−03 | −1.4630E−03 | −4.3672E−04 | 1.2319E−04 | 4.9133E−06 | 4.2968E−06 | −1.6045E−06 |
| S4 | 1.8920E−02 | −1.2302E−03 | −1.4782E−03 | 5.6357E−04 | 2.0675E−05 | −3.9038E−05 | 4.8667E−06 |
| S5 | −2.5371E−02 | 8.1871E−03 | −3.9720E−03 | 1.9803E−03 | −5.0981E−04 | 6.9087E−05 | −6.6929E−06 |
| S6 | −4.7436E−02 | 1.6863E−02 | −9.7186E−03 | 5.2516E−03 | −1.3631E−03 | 9.5834E−05 | 2.3365E−05 |
| S7 | −1.9592E−02 | 1.8445E−02 | −1.3685E−02 | 5.1510E−03 | −1.2125E−03 | 8.1171E−05 | 8.2688E−06 |
| S8 | −1.2957E−02 | 2.9686E−02 | −1.3346E−02 | 2.9037E−03 | −5.7308E−04 | 4.6156E−05 | −4.9295E−06 |
| S9 | −8.5932E−02 | 2.1768E−02 | −1.3861E−03 | −1.3845E−03 | −3.5887E−04 | 5.2303E−04 | −1.1640E−04 |
| S10 | −7.1575E−02 | 2.0383E−02 | −4.8060E−03 | 1.4897E−04 | 2.2875E−04 | −5.5241E−05 | 3.4888E−06 |

TABLE 6

| | | | |
|---|---|---|---|
| f1(mm) | 4.67 | f(mm) | 10.80 |
| f2(mm) | −15.13 | TTL(mm) | 11.25 |
| f3(mm) | −16.41 | HFOV(deg) | 16.29 |
| f4(mm) | −63.33 | | |
| f5(mm) | −27.34 | | |

Figure 4A:
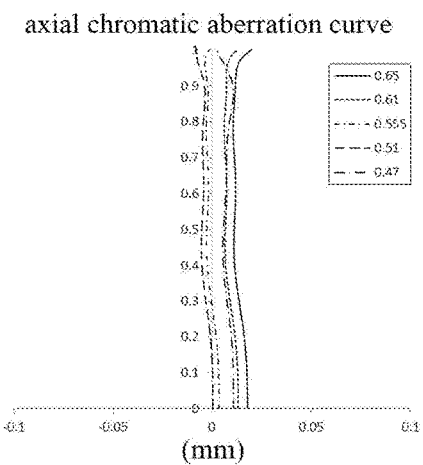
FIG. 4A illustrates an axial chromatic aberration curve of the camera lens assembly according to Embodiment 2.
Figure 4B:
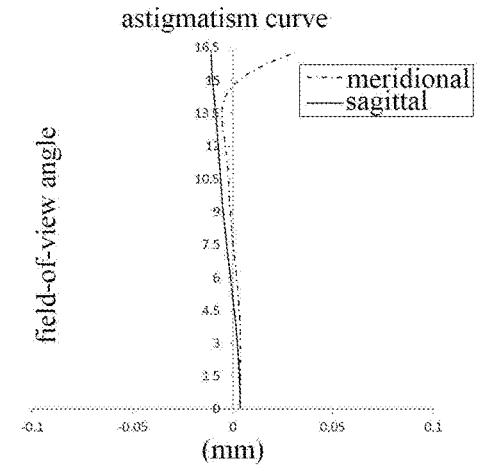
FIG. 4B illustrates an astigmatism curve of the camera lens assembly according to Embodiment 2.
Figure 4C:
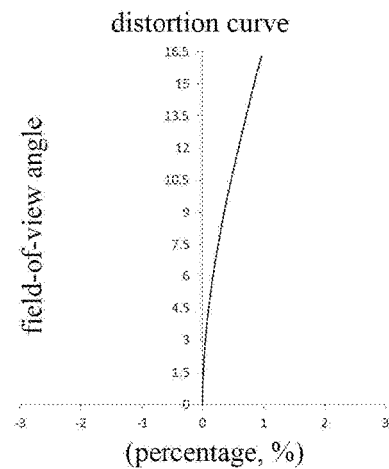
FIG. 4C illustrates a distortion curve of the camera lens assembly according to Embodiment 2.
Figure 4D:
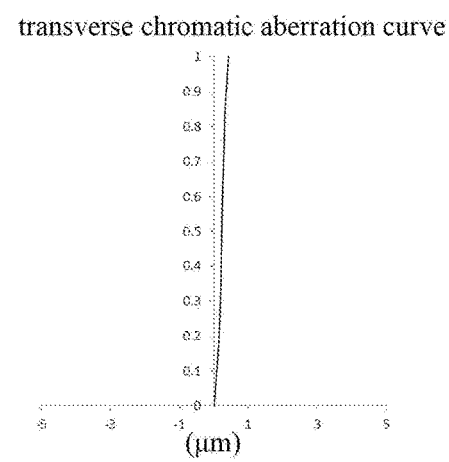
FIG. 4D illustrates a transverse chromatic aberration curve of the camera lens assembly according to Embodiment 2.

FIG. 4A illustrates an axial chromatic aberration curve of the camera lens assembly according to Embodiment 2, representing deviations of focal points of light of different wavelengths converged after passing through an optical system. FIG. 4B illustrates an astigmatism curve of the camera lens assembly according to Embodiment 2, representing a curvature of a meridional image plane and a curvature of a sagittal image plane. FIG. 4C illustrates a distortion curve of the camera lens assembly according to Embodiment 2, representing amounts of distortion at different viewing angles. FIG. 4D illustrates a transverse chromatic aberration curve of the camera lens assembly according to Embodiment 2, representing deviations of different image heights on an image plane after light passes through the camera lens assembly. It can be seen from FIG. 4A to FIG. 4D that the camera lens assembly provided in Embodiment 2 achieves good image quality.

Embodiment 3

Figure 5:
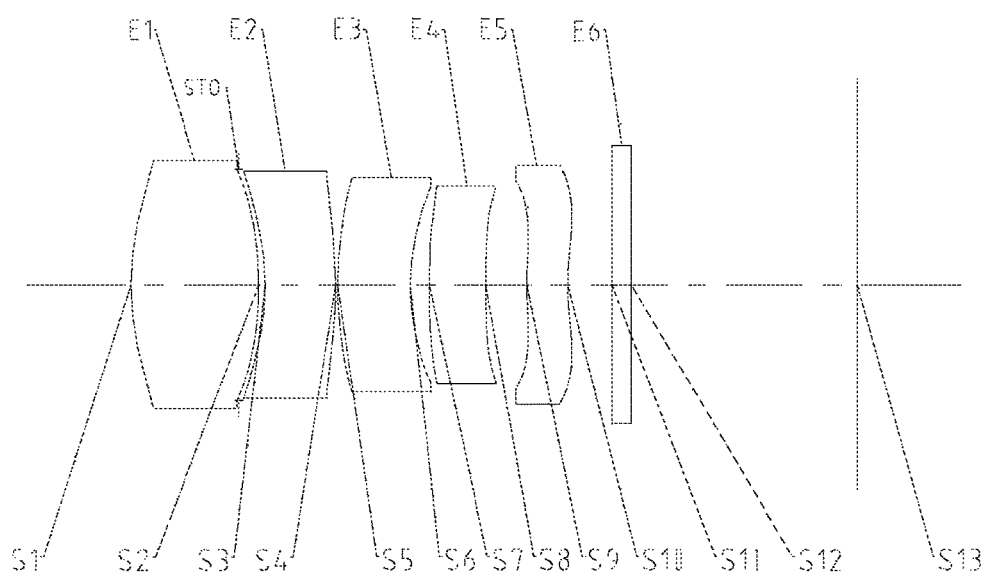
FIG. 5 is a schematic structural diagram of a camera lens assembly according to Embodiment 3.

A camera lens assembly according to Embodiment 3 of the present application is described below with reference to FIG. 5 to FIG. 6D. FIG. 5 is a schematic structural diagram of a camera lens assembly according to Embodiment 3.

As shown in FIG. 5, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 7 shows a surface form, radius of curvature, thickness, material and conic coefficient of each lens in Embodiment 3. Table 8 shows a high-order coefficient of each aspheric mirror surface in Embodiment 3. Table 9 shows the effective focal lengths f1 to f5 of the lenses, the total effective focal length f of the camera lens assembly, and a total track length TTL and a half field-of-view angle HFOV of the camera lens according to Embodiment 3.

TABLE 7

| surface number | surface form | radius of curvature | thickness | material | conic coefficient |
|---|---|---|---|---|---|
| OBJ | spherical | infinite | infinite | | |
| S1 | aspheric | infinite | infinite | | |
| S2 | aspheric | 4.4569 | 1.9840 | 1.544, 56.11 | −0.8323 |
| STO | spherical | −5.4686 | −0.3105 | | −12.1609 |
| S3 | aspheric | infinite | 0.4105 | | 0.0000 |
| S4 | aspheric | −3.4269 | 1.0877 | 1.635, 23.78 | −8.2587 |
| S5 | aspheric | −6.5248 | 0.0300 | | 3.3272 |
| S6 | aspheric | 5.1454 | 1.1224 | 1.544, 56.11 | 6.3377 |
| S7 | aspheric | 3.0761 | 0.2945 | | 1.3499 |
| S8 | aspheric | 17.9056 | 0.8801 | 1.64, 23.53 | 47.1718 |
| S9 | aspheric | 16.6186 | 0.6363 | | 39.9586 |
| S10 | aspheric | 5.5337 | 0.6336 | 1.544, 56.11 | −26.0529 |
| S11 | spherical | 3.9424 | 0.6812 | | −4.5708 |
| S12 | spherical | infinite | 0.3000 | 1.517, 64.17 | 0.0000 |
| S13 | spherical | infinite | | | |

TABLE 8

| surface number | A4 | A6 | A8 | A10 | A12 | A14 | A16 |
|---|---|---|---|---|---|---|---|
| S1 | −2.6611E−03 | −5.7520E−04 | 8.1050E−05 | −8.1679E−05 | 2.7980E−05 | −5.2142E−06 | 3.5705E−07 |
| S2 | −9.3719E−03 | 1.3442E−03 | −1.2596E−03 | 3.8504E−04 | −5.0688E−05 | 5.4252E−06 | −6.8964E−07 |
| S3 | 4.9039E−03 | −1.3713E−03 | −4.7070E−04 | 1.1348E−04 | 3.3922E−06 | 4.2132E−06 | −1.3536E−06 |
| S4 | 1.7719E−02 | −1.2925E−03 | −1.4032E−03 | 5.4101E−04 | 1.0903E−05 | −3.6807E−05 | 4.9953E−06 |
| S5 | −2.9520E−02 | 8.2623E−03 | −4.0361E−03 | 1.9588E−03 | −5.0663E−04 | 6.4276E−05 | −6.0499E−06 |
| S6 | −4.6698E−02 | 1.7938E−02 | −1.0434E−02 | 5.4216E−03 | −1.4576E−03 | 1.1466E−04 | 1.9648E−05 |
| S7 | 7.8796E−04 | 1.7976E−02 | −1.2988E−02 | 5.0574E−03 | −1.2055E−03 | 8.1577E−05 | 1.5193E−05 |
| S8 | −1.0161E−02 | 3.1078E−02 | −1.3362E−02 | 3.1265E−03 | −5.7058E−04 | 5.3543E−05 | −1.3493E−06 |
| S9 | −8.5171E−02 | 2.5197E−02 | −3.2474E−03 | −9.5123E−04 | −3.2973E−04 | 4.2153E−04 | −9.0514E−05 |
| S10 | −8.0306E−02 | 2.6909E−02 | −7.8042E−03 | 1.1156E−03 | −2.7603E−07 | −2.0909E−05 | 1.1396E−06 |

TABLE 9

| f1(mm) | 4.84 | f(mm) | 10.80 |
|---|---|---|---|
| f2(mm) | −13.06 | TTL(mm) | 11.25 |
| f3(mm) | −17.33 | HFOV(deg) | 16.30 |
| f4(mm) | −490.02 | | |
| f5(mm) | −29.22 | | |

Figure 6A:
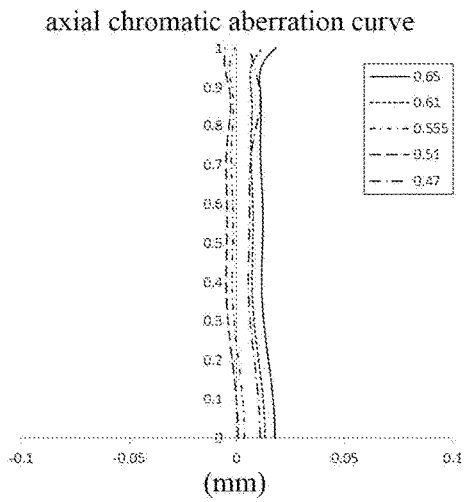
FIG. 6A illustrates an axial chromatic aberration curve of the camera lens assembly according to Embodiment 3.
Figure 6B:
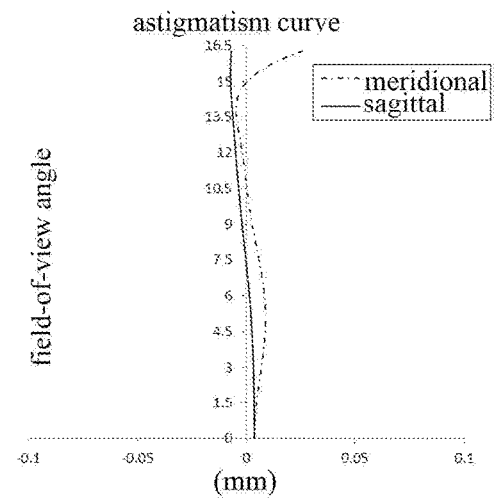
FIG. 6B illustrates an astigmatism curve of the camera lens assembly according to Embodiment 3.
Figure 6C:
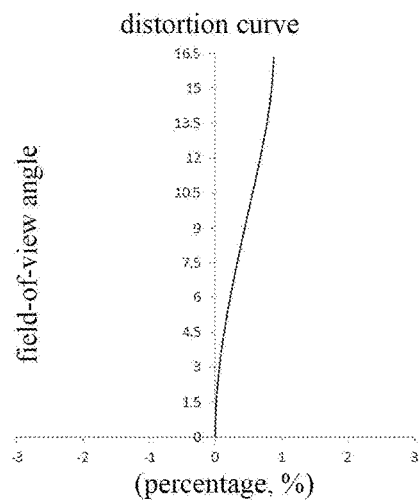
FIG. 6C illustrates a distortion curve of the camera lens assembly according to Embodiment 3.
Figure 6D:
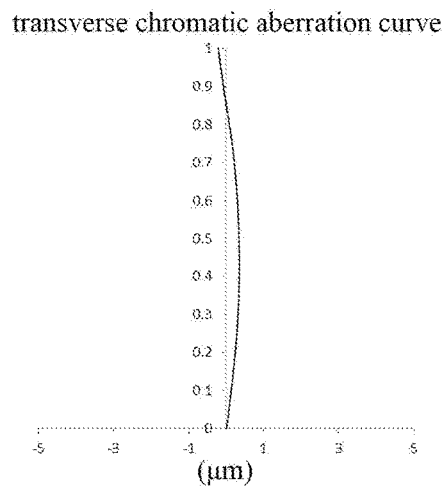
FIG. 6D illustrates a transverse chromatic aberration curve of the camera lens assembly according to Embodiment 3.

FIG. 6A illustrates an axial chromatic aberration curve of the camera lens assembly according to Embodiment 3, representing deviations of focal points of light of different wavelengths converged after passing through an optical system. FIG. 6B illustrates an astigmatism curve of the camera lens assembly according to Embodiment 3, representing a curvature of a meridional image plane and a curvature of a sagittal image plane. FIG. 6C illustrates a distortion curve of the camera lens assembly according to Embodiment 3, representing amounts of distortion at different viewing angles. FIG. 6D illustrates a transverse chromatic aberration curve of the camera lens assembly according to Embodiment 3, representing deviations of different image heights on an image plane after light passes through the camera lens assembly. It can be seen from FIG. 6A to FIG. 6D that the camera lens assembly provided in Embodiment 3 achieves good image quality.

Embodiment 4

Figure 7:
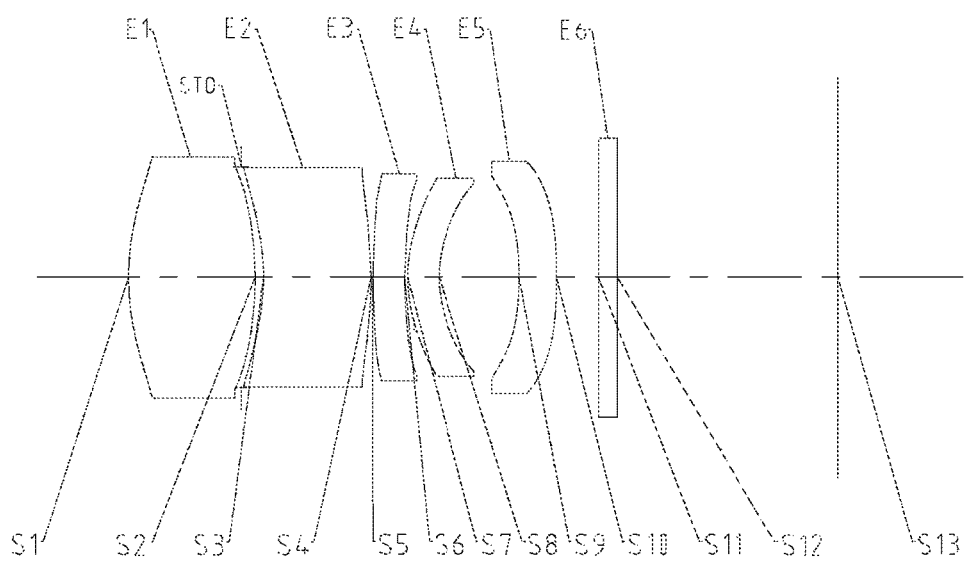
FIG. 7 is a schematic structural diagram of a camera lens assembly according to Embodiment 4.

A camera lens assembly according to Embodiment 4 of the present application is described below with reference to FIG. 7 to FIG. 8D. FIG. 7 is a schematic structural diagram of a camera lens assembly according to Embodiment 4.

As shown in FIG. 7, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 10 shows a surface form, radius of curvature, thickness, material and conic coefficient of each lens in Embodiment 4. Table 11 shows a high-order coefficient of each aspheric mirror surface in Embodiment 4. Table 12 shows the effective focal lengths f1 to f5 of the lenses, the total effective focal length f of the camera lens assembly, and a total track length TTL and a half field-of-view angle HFOV of the camera lens according to Embodiment 4.

TABLE 10

| surface number | surface form | radius of curvature | thickness | material | conic coefficient |
|---|---|---|---|---|---|
| OBJ | spherical | infinite | infinite | | |
| S1 | aspheric | 4.1134 | 2.0138 | 1.544, 56.11 | −0.8095 |
| S2 | aspheric | −5.2107 | −0.2161 | | −23.5438 |
| STO | spherical | infinite | 0.3479 | | 0.0000 |
| S3 | aspheric | −3.2430 | 1.7005 | 1.635, 23.78 | −11.2058 |
| S4 | aspheric | −6.4990 | 0.0300 | | 4.0875 |
| S5 | aspheric | 10.1027 | 0.5000 | 1.544, 56.11 | −3.9559 |
| S6 | aspheric | 6.7714 | 0.0500 | | 14.0987 |
| S7 | aspheric | 2.3914 | 0.5000 | 1.64, 23.53 | −2.0896 |
| S8 | aspheric | 2.0109 | 1.2686 | | −0.0178 |
| S9 | aspheric | −5.6682 | 0.5937 | 1.544, 56.11 | 2.3529 |
| S10 | aspheric | −11.0991 | 0.6618 | | −99.0000 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 11

| surface number | A4 | A6 | A8 | A10 | A12 | A14 | A16 |
|---|---|---|---|---|---|---|---|
| S1 | −2.0896E−03 | −4.2191E−04 | −2.5519E−04 | 1.0388E−04 | −3.4746E−05 | 4.8563E−06 | −2.7948E−07 |
| S2 | −4.3144E−03 | −3.3052E−03 | 3.3677E−04 | −1.4153E−04 | 1.1708E−04 | −2.6409E−05 | 1.7932E−06 |
| S3 | 3.2587E−03 | −1.5304E−03 | −3.2001E−04 | 1.4325E−04 | 1.3957E−06 | 2.7609E−06 | −1.0963E−06 |
| S4 | 1.4237E−02 | 6.7347E−04 | −1.5248E−03 | 3.9222E−04 | −3.4331E−06 | −5.2960E−06 | 2.3111E−07 |
| S5 | −1.4480E−02 | 8.5156E−03 | −4.0059E−03 | 1.8320E−03 | −3.0088E−04 | −7.1672E−06 | 7.5298E−06 |
| S6 | −2.1819E−02 | 1.0027E−02 | −9.7958E−03 | 6.1582E−03 | −1.1328E−03 | −1.8411E−04 | 6.4248E−05 |
| S7 | −1.7349E−02 | 1.6149E−02 | −1.1272E−02 | 5.4007E−03 | −1.1053E−03 | 5.0493E−05 | −7.0956E−07 |
| S8 | −4.6663E−02 | 2.0021E−02 | −7.3716E−03 | 1.3930E−03 | −2.1776E−04 | 4.2524E−05 | −1.3459E−04 |
| S9 | −4.1509E−02 | 2.3552E−03 | 4.2101E−03 | −3.6459E−03 | 1.3764E−03 | −2.1705E−04 | 2.3759E−05 |
| S10 | −4.1886E−02 | 7.4196E−03 | −1.5736E−03 | 8.0683E−05 | −1.2750E−05 | 1.5771E−05 | −3.1380E−06 |

TABLE 12

| f1(mm) | 4.56 | f(mm) | 10.80 |
|---|---|---|---|
| f2(mm) | −12.70 | TTL(mm) | 11.25 |
| f3(mm) | −39.72 | HFOV(deg) | 16.29 |
| f4(mm) | −40.44 | | |
| f5(mm) | −22.07 | | |

Figure 8A:
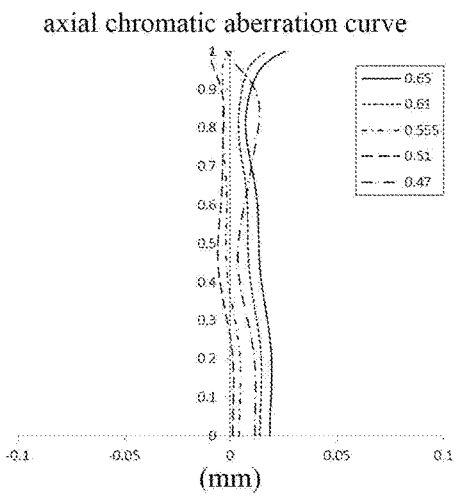
FIG. 8A illustrates an axial chromatic aberration curve of the camera lens assembly according to Embodiment 4.
Figure 8B:
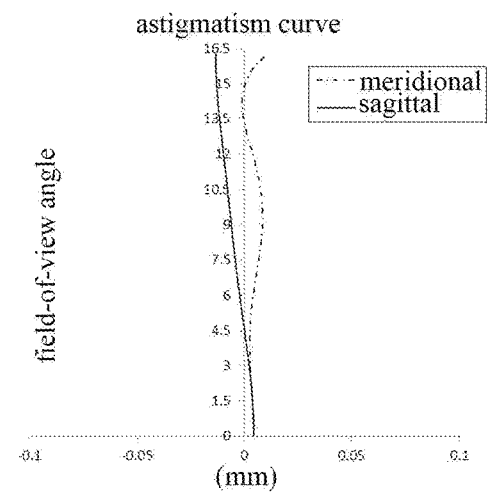
FIG. 8B illustrates an astigmatism curve of the camera lens assembly according to Embodiment 4.
Figure 8C:
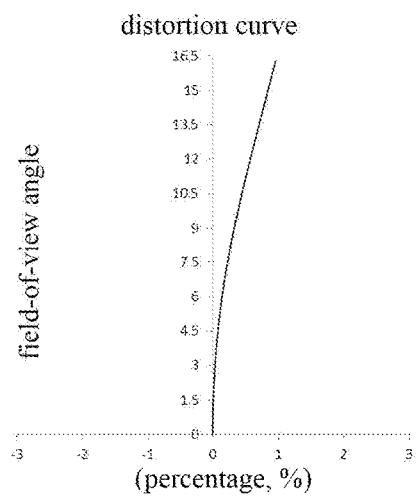
FIG. 8C illustrates a distortion curve of the camera lens assembly according to Embodiment 4.
Figure 8D:
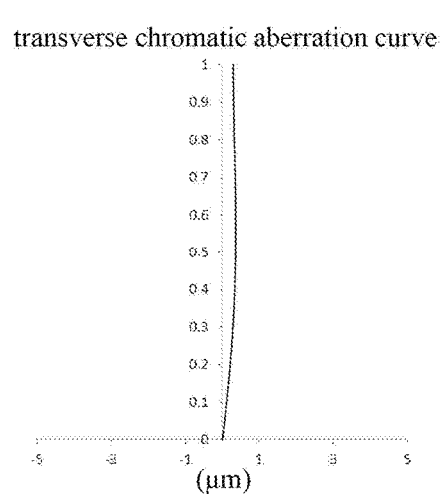
FIG. 8D illustrates a transverse chromatic aberration curve of the camera lens assembly according to Embodiment 4.

FIG. 8A illustrates an axial chromatic aberration curve of the camera lens assembly according to Embodiment 4, representing deviations of focal points of light of different wavelengths converged after passing through an optical system. FIG. 8B illustrates an astigmatism curve of the camera lens assembly according to Embodiment 4, representing a curvature of a meridional image plane and a curvature of a sagittal image plane. FIG. 8C illustrates a distortion curve of the camera lens assembly according to Embodiment 4, representing amounts of distortion at different viewing angles. FIG. 8D illustrates a transverse chromatic aberration curve of the camera lens assembly according to Embodiment 4, representing deviations of different image heights on an image plane after light passes through the camera lens assembly. It can be seen from FIG. 8A to FIG. 8D that the camera lens assembly provided in Embodiment 4 achieves good image quality.

Embodiment 5

Figure 9:
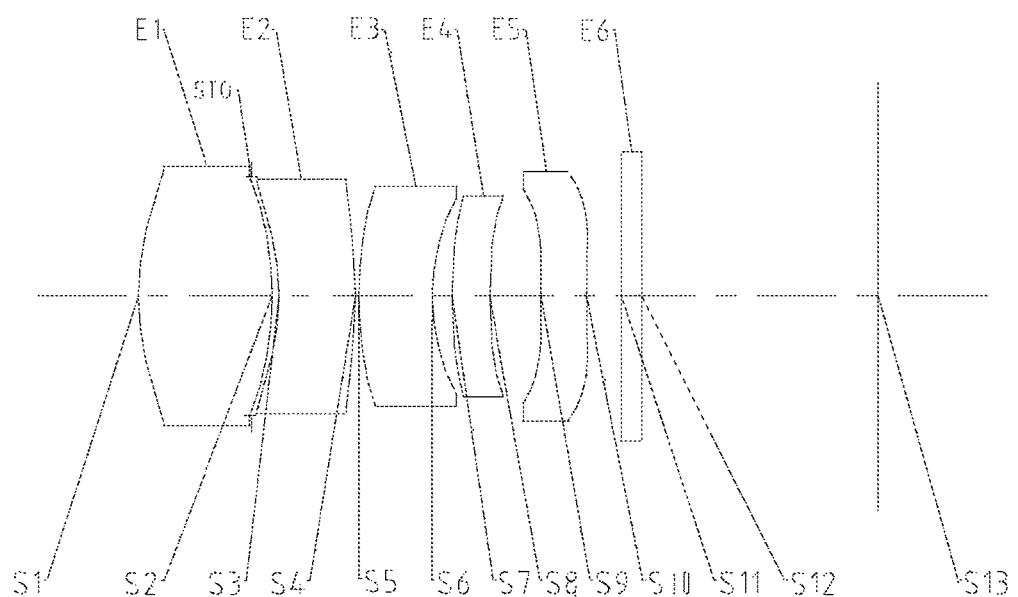
FIG. 9 is a schematic structural diagram of a camera lens assembly according to Embodiment 5.

A camera lens assembly according to Embodiment 5 of the present application is described below with reference to FIG. 9 to FIG. 10D. FIG. 9 is a schematic structural diagram of a camera lens assembly according to Embodiment 5.

As shown in FIG. 9, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 13 shows a surface form, radius of curvature, thickness, material and conic coefficient of each lens in Embodiment 5. Table 14 shows a high-order coefficient of each aspheric mirror surface in Embodiment 5. Table 15 shows the effective focal lengths f1 to f5 of the lenses, the total effective focal length f of the camera lens assembly, and a total track length TTL and a half field-of-view angle HFOV of the camera lens according to Embodiment 5.

TABLE 13

| surface number | surface form | radius of curvature | thickness | material | conic coefficient |
|---|---|---|---|---|---|
| OBJ | spherical | infinite | infinite | | |
| S1 | aspheric | 4.1602 | 1.9828 | 1.544, 56.11 | −0.6713 |
| S2 | aspheric | −4.9141 | −0.3062 | | −13.6417 |
| STO | spherical | infinite | 0.4088 | | 0.0000 |
| S3 | aspheric | −3.2616 | 1.1283 | 1.635, 23.78 | −8.3116 |
| S4 | aspheric | −6.3604 | 0.0500 | | 2.3261 |
| S5 | aspheric | 5.2703 | 1.0819 | 1.544, 56.11 | 6.7273 |
| S6 | aspheric | 2.7430 | 0.2942 | | 1.5783 |
| S7 | aspheric | 8.9780 | 0.5587 | 1.64, 23.53 | 22.9422 |
| S8 | aspheric | 9.1156 | 0.7650 | | 27.0048 |
| S9 | aspheric | 13.8594 | 0.6728 | 1.544, 56.11 | −78.5122 |
| S10 | aspheric | 7.4931 | 0.5137 | | −6.2663 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 14

| surface number | A4 | A6 | A8 | A10 | A12 | A14 | A16 |
|---|---|---|---|---|---|---|---|
| S1 | −2.3966E−03 | −4.5013E−04 | −5.3871E−05 | 8.8646E−06 | −4.0333E−06 | 6.4173E−07 | −7.2157E−08 |
| S2 | −8.6656E−03 | 6.9450E−04 | −7.1616E−04 | 1.7228E−04 | 5.0950E−06 | −4.0702E−06 | −1.6679E−08 |
| S3 | 4.3989E−03 | −1.3360E−03 | −4.1851E−04 | 1.1695E−04 | 1.4556E−06 | 3.7886E−06 | −1.3977E−06 |
| S4 | 1.9635E−02 | −1.6284E−03 | −1.5254E−03 | 5.7464E−04 | 2.1171E−05 | −4.1270E−05 | 5.2024E−06 |
| S5 | −2.5120E−02 | 8.5637E−03 | −4.0411E−03 | 1.9727E−03 | −5.0675E−04 | 6.9035E−05 | −7.5524E−06 |
| S6 | −4.7112E−02 | 1.2836E−02 | −9.0867E−03 | 5.1758E−03 | −1.3444E−03 | 9.7136E−05 | 2.4312E−05 |
| S7 | −4.0612E−03 | 1.9106E−02 | −1.4012E−02 | 5.1967E−03 | −1.2073E−03 | 8.2732E−05 | 8.8057E−06 |
| S8 | −1.4498E−02 | 3.1163E−02 | −1.3035E−02 | 3.0551E−03 | −6.6985E−04 | 4.7067E−05 | −4.9589E−06 |
| S9 | −8.6597E−02 | 1.9542E−02 | 1.5368E−04 | −2.1132E−03 | 1.1248E−04 | 3.1919E−04 | −7.8807E−05 |
| S10 | −6.9353E−02 | 1.8520E−02 | −4.6556E−03 | 6.2637E−04 | −6.9753E−05 | 1.7033E−05 | −3.0460E−06 |

TABLE 15

| f1(mm) | 4.47 | f(mm) | 10.73 |
|---|---|---|---|
| f2(mm) | −12.19 | TTL(mm) | 10.95 |
| f3(mm) | −12.34 | HFOV(deg) | 16.38 |
| f4(mm) | 356.08 | | |
| f5(mm) | −31.04 | | |

Figure 10A:
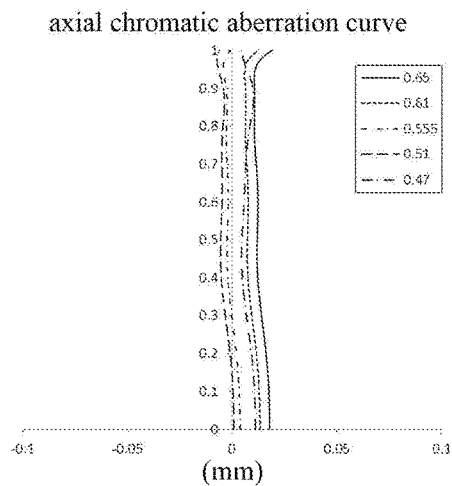
FIG. 10A illustrates an axial chromatic aberration curve of the camera lens assembly according to Embodiment 5.
Figure 10B:
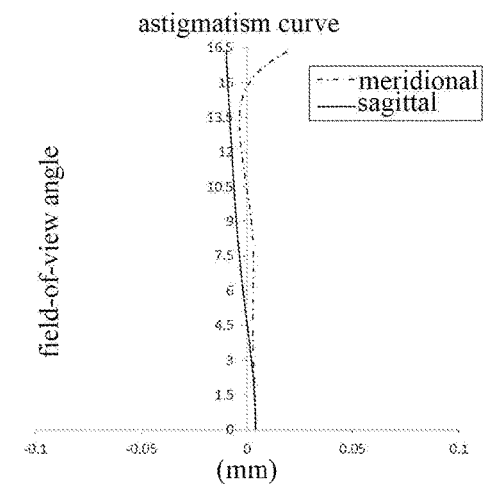
FIG. 10B illustrates an astigmatism curve of the camera lens assembly according to Embodiment 5.
Figure 10C:
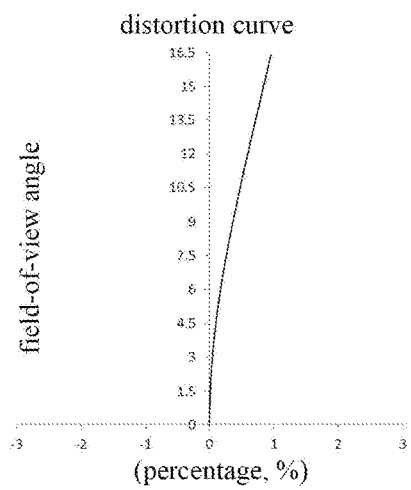
FIG. 10C illustrates a distortion curve of the camera lens assembly according to Embodiment 5.
Figure 10D:
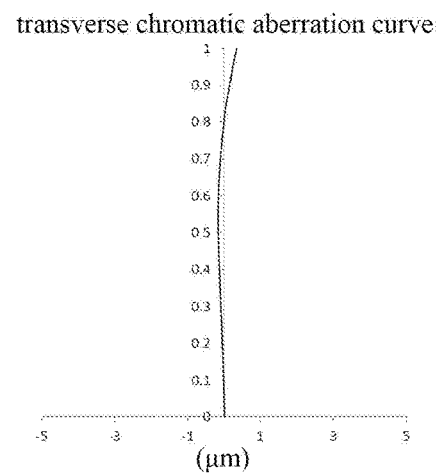
FIG. 10D illustrates a transverse chromatic aberration curve of the camera lens assembly according to Embodiment 5.

FIG. 10A illustrates an axial chromatic aberration curve of the camera lens assembly according to Embodiment 5, representing deviations of focal points of light of different wavelengths converged after passing through an optical system. FIG. 10B illustrates an astigmatism curve of the camera lens assembly according to Embodiment 5, representing a curvature of a meridional image plane and a curvature of a sagittal image plane. FIG. 10C illustrates a distortion curve of the camera lens assembly according to Embodiment 5, representing amounts of distortion at different viewing angles. FIG. 10D illustrates a transverse chromatic aberration curve of the camera lens assembly according to Embodiment 5, representing deviations of different image heights on an image plane after light passes through the camera lens assembly. It can be seen from FIG. 10A to FIG. 10D that the camera lens assembly provided in Embodiment 5 achieves good image quality.

Embodiment 6

Figure 11:
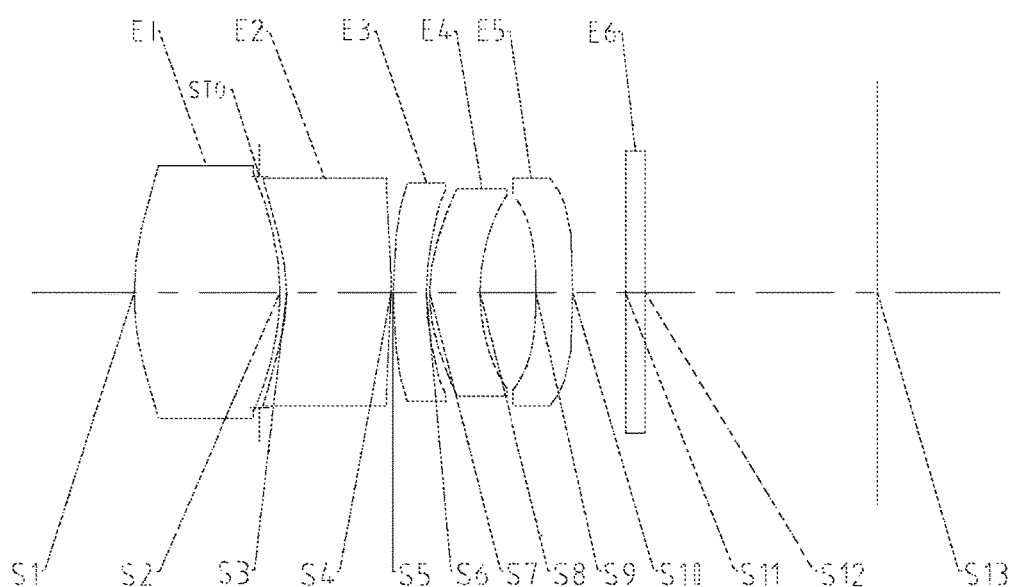
FIG. 11 is a schematic structural diagram of a camera lens assembly according to Embodiment 6.

A camera lens assembly according to Embodiment 6 of the present application is described below with reference to FIG. 11 to FIG. 12D. FIG. 11 is a schematic structural diagram of a camera lens assembly according to Embodiment 6.

As shown in FIG. 11, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 16 shows a surface form, radius of curvature, thickness, material and conic coefficient of each lens in Embodiment 6. Table 17 shows a high-order coefficient of each aspheric mirror surface in Embodiment 6. Table 18 shows the effective focal lengths f1 to f5 of the lenses, the total effective focal length f of the camera lens assembly, and a total track length TTL and a half field-of-view angle HFOV of the camera lens according to Embodiment 6.

TABLE 16

| surface number | surface form | radius of curvature | thickness | material | conic coefficient |
|---|---|---|---|---|---|
| OBJ | spherical | infinite | infinite | | |
| S1 | aspheric | 4.2060 | 2.2025 | 1.544, 56.11 | −0.7838 |
| S2 | aspheric | −3.0098 | −0.3106 | | −16.9717 |
| STO | spherical | infinite | 0.4106 | | 0.0000 |
| S3 | aspheric | −2.3150 | 1.5697 | 1.614, 25.57 | −10.3721 |
| S4 | aspheric | −9.8877 | 0.0300 | | 2.5820 |
| S5 | aspheric | 7.3216 | 0.5000 | 1.544, 56.11 | 14.9900 |
| S6 | aspheric | 3.5780 | 0.0500 | | −1.2710 |
| S7 | aspheric | 2.3769 | 0.7580 | 1.64, 23.53 | −2.5352 |
| S8 | aspheric | 2.7666 | 0.8489 | | 0.6653 |
| S9 | aspheric | −10.2490 | 0.5533 | 1.544, 56.11 | −52.1069 |
| S10 | aspheric | −194.2966 | 0.7934 | | −99.0000 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 17

| surface number | A4 | A6 | A8 | A10 | A12 | A14 | A16 |
|---|---|---|---|---|---|---|---|
| S1 | −1.9041E−03 | −3.5399E−04 | −4.7451E−04 | 2.6005E−04 | −8.9280E−05 | 1.4328E−05 | −9.4574E−07 |
| S2 | −5.8862E−03 | −2.5300E−04 | −1.7022E−03 | 7.4955E−04 | −1.2535E−04 | 9.7135E−06 | −5.0215E−07 |
| S3 | 4.5961E−03 | −1.3603E−03 | −3.6334E−04 | 1.3992E−04 | 3.7671E−06 | 2.9610E−06 | −1.3161E−06 |
| S4 | 1.2262E−02 | −1.0948E−05 | −1.2595E−03 | 4.2219E−04 | −4.3281E−05 | −1.9918E−06 | 2.5540E−07 |
| S5 | −1.4520E−02 | 7.8704E−03 | −4.6110E−03 | 1.6158E−03 | −2.0217E−04 | 9.7196E−06 | −4.9289E−06 |
| S6 | −2.3815E−02 | 1.0442E−02 | −1.0440E−02 | 6.4369E−03 | −1.0974E−03 | −1.2340E−04 | 4.8072E−05 |
| S7 | −2.1080E−02 | 1.4744E−02 | −9.7998E−03 | 4.7107E−03 | −1.2622E−03 | 1.8329E−04 | −1.3166E−05 |
| S8 | −3.2432E−02 | 1.8919E−02 | −4.6156E−03 | 9.1541E−04 | −1.1154E−05 | 6.1663E−04 | −9.5785E−05 |
| S9 | −7.2808E−02 | 2.3463E−02 | −2.1797E−02 | 2.2623E−02 | −1.4896E−02 | 4.9531E−03 | −6.6296E−04 |
| S10 | −4.9864E−02 | 1.5951E−02 | −1.1298E−02 | 7.5244E−03 | −3.5222E−03 | 8.8151E−04 | −9.1820E−05 |

TABLE 18

| f1(mm) | 3.60 | f(mm) | 10.73 |
|---|---|---|---|
| f2(mm) | −5.31 | TTL(mm) | 11.21 |
| f3(mm) | −13.45 | HFOV(deg) | 16.30 |
| f4(mm) | 14.85 | | |
| f5(mm) | −19.84 | | |

Figure 12A:
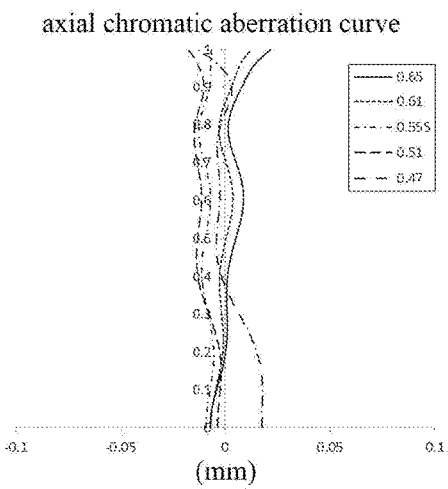
FIG. 12A illustrates an axial chromatic aberration curve of the camera lens assembly according to Embodiment 6.
Figure 12B:
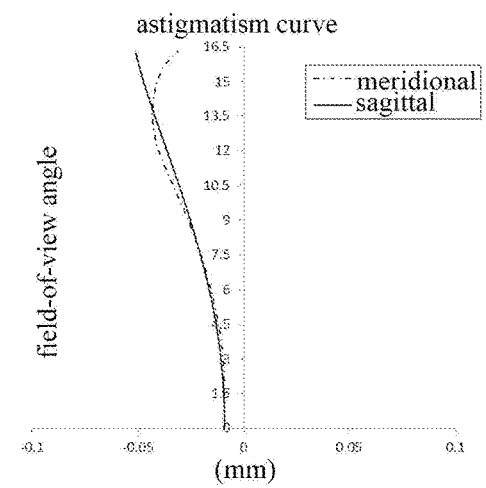
FIG. 12B illustrates an astigmatism curve of the camera lens assembly according to Embodiment 6.
Figure 12C:
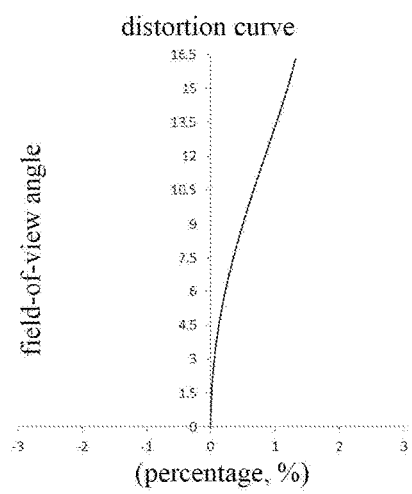
FIG. 12C illustrates a distortion curve of the camera lens assembly according to Embodiment 6.
Figure 12D:
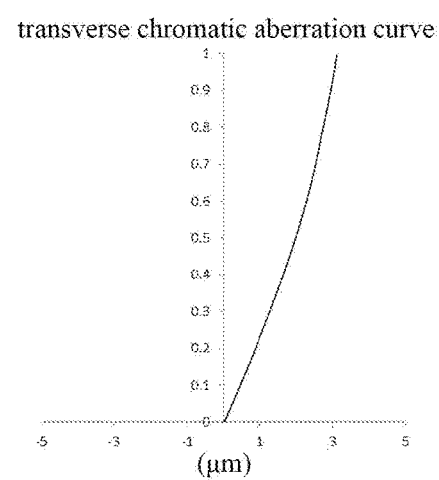
FIG. 12D illustrates a transverse chromatic aberration curve of the camera lens assembly according to Embodiment 6.

FIG. 12A illustrates an axial chromatic aberration curve of the camera lens assembly according to Embodiment 6, representing deviations of focal points of light of different wavelengths converged after passing through an optical system. FIG. 12B illustrates an astigmatism curve of the camera lens assembly according to Embodiment 6, representing a curvature of a meridional image plane and a curvature of a sagittal image plane. FIG. 12C illustrates a distortion curve of the camera lens assembly according to Embodiment 6, representing amounts of distortion at different viewing angles. FIG. 12D illustrates a transverse chromatic aberration curve of the camera lens assembly according to Embodiment 6, representing deviations of different image heights on an image plane after light passes through the camera lens assembly. It can be seen from FIG. 12A to FIG. 12D that the camera lens assembly provided in Embodiment 6 achieves good image quality.

Embodiment 7

Figure 13:
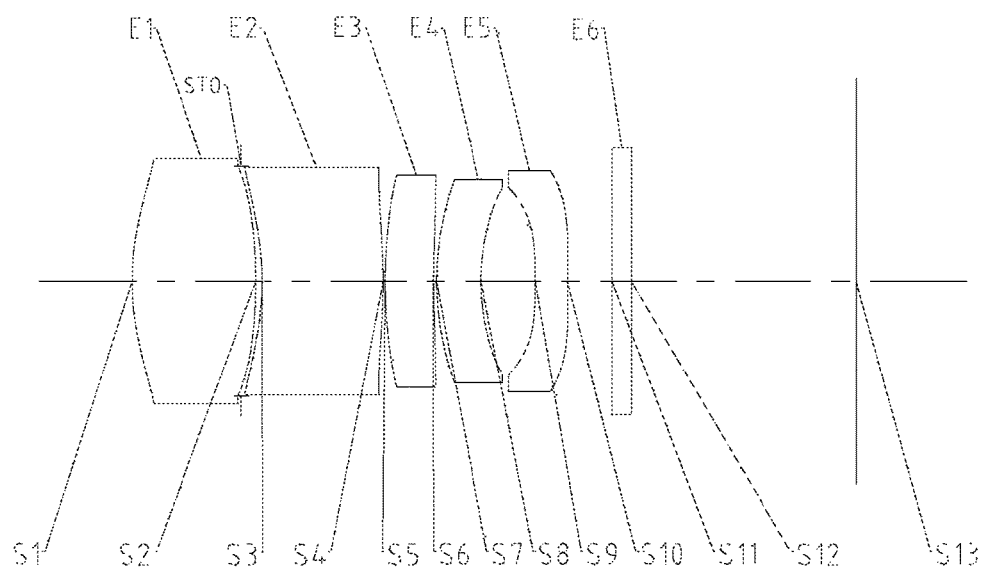
FIG. 13 is a schematic structural diagram of a camera lens assembly according to Embodiment 7.

A camera lens assembly according to Embodiment 7 of the present application is described below with reference to FIG. 13 to FIG. 14D. FIG. 13 is a schematic structural diagram of a camera lens assembly according to Embodiment 7.

As shown in FIG. 13, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 19 shows a surface form, radius of curvature, thickness, material and conic coefficient of each lens in Embodiment 7. Table 20 shows a high-order coefficient of each aspheric mirror surface in Embodiment 7. Table 21 shows the effective focal lengths f1 to f5 of the lenses, the total effective focal length f of the camera lens assembly, and a total track length TTL and a half field-of-view angle HFOV of the camera lens according to Embodiment 7.

TABLE 19

| surface number | surface form | radius of curvature | thickness | material | conic coefficient |
|---|---|---|---|---|---|
| OBJ | spherical | infinite | infinite | | |
| S1 | aspheric | 4.2722 | 1.9292 | 1.544, 56.11 | −1.1019 |
| S2 | aspheric | −7.5954 | −0.2267 | | −20.0887 |
| STO | spherical | infinite | 0.3267 | | 0.0000 |
| S3 | aspheric | −3.9815 | 1.8792 | 1.614, 25.57 | −11.2233 |
| S4 | aspheric | −8.5582 | 0.0300 | | −6.2460 |
| S5 | aspheric | 6.8766 | 0.7500 | 1.544, 56.11 | 12.6314 |
| S6 | aspheric | 11.1769 | 0.0500 | | 3.6036 |
| S7 | aspheric | 4.3001 | 0.6964 | 1.64, 23.53 | 0.2087 |
| S8 | aspheric | 3.1670 | 0.8451 | | 0.6924 |
| S9 | aspheric | −15.2373 | 0.5000 | 1.544, 56.11 | 50.0000 |
| S10 | aspheric | 12.6559 | 0.6920 | | −94.9302 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 20

| surface number | A4 | A6 | A8 | A10 | A12 | A14 | A16 |
|---|---|---|---|---|---|---|---|
| S1 | −2.5537E−03 | −5.0868E−04 | −2.4077E−04 | 8.5351E−05 | −2.7568E−05 | 3.7054E−06 | −1.8112E−07 |
| S2 | −2.5597E−03 | −3.4879E−03 | 9.5149E−08 | 7.4225E−05 | 6.1630E−05 | −1.8114E−05 | 1.1187E−06 |
| S3 | 4.4634E−03 | −1.3109E−03 | −3.4610E−04 | 1.4132E−04 | 3.6080E−06 | 2.9495E−06 | −1.2699E−06 |
| S4 | 1.3778E−02 | 8.4715E−04 | −1.4676E−03 | 3.9645E−04 | −3.2401E−05 | 8.6692E−07 | −2.6085E−07 |
| S5 | −1.6459E−02 | 5.8400E−03 | −4.3772E−03 | 1.6490E−03 | −2.2693E−04 | 4.0018E−06 | −1.1030E−06 |
| S6 | −2.1993E−02 | 1.0844E−02 | −1.1345E−02 | 6.1711E−03 | −1.0912E−03 | −1.0616E−04 | 4.0972E−05 |
| S7 | −1.4827E−02 | 1.2998E−02 | −9.7515E−03 | 4.8310E−03 | −1.2715E−03 | 1.6294E−04 | −1.0852E−05 |
| S8 | −3.2368E−02 | 1.7184E−02 | −4.0170E−03 | 1.0822E−03 | −1.1626E−03 | 6.0283E−04 | −7.1215E−05 |
| S9 | −1.0236E−01 | 1.4442E−02 | 6.9179E−03 | −6.2157E−03 | 1.0538E−03 | 2.4931E−04 | −5.0060E−05 |
| S10 | −7.3542E−02 | 2.2252E−02 | −5.4892E−03 | 1.1699E−03 | −5.3065E−04 | 1.9427E−04 | −2.7191E−05 |

TABLE 21

| | | | |
|---|---|---|---|
| f1(mm) | 5.31 | f(mm) | 10.68 |
| f2(mm) | −14.28 | TTL(mm) | 11.27 |
| f3(mm) | 30.84 | HFOV(deg) | 16.38 |
| f4(mm) | −24.56 | | |
| f5(mm) | −12.58 | | |

Figure 14A:
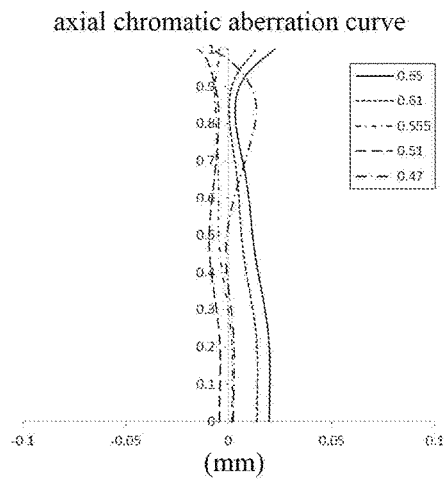
FIG. 14A illustrates an axial chromatic aberration curve of the camera lens assembly according to Embodiment 7.
Figure 14B:
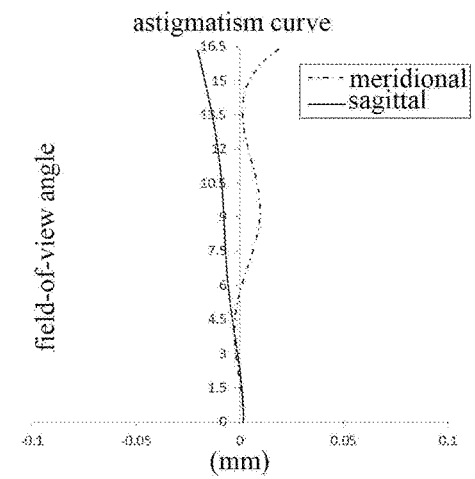
FIG. 14B illustrates an astigmatism curve of the camera lens assembly according to Embodiment 7.
Figure 14C:
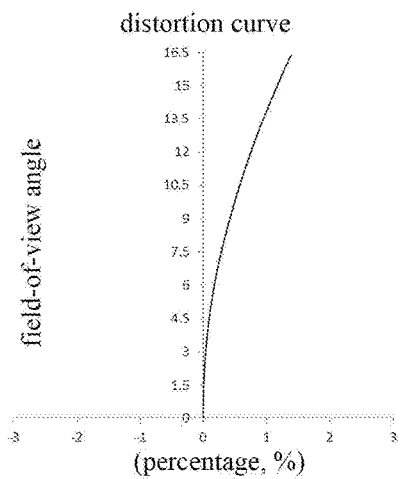
FIG. 14C illustrates a distortion curve of the camera lens assembly according to Embodiment 7.
Figure 14D:
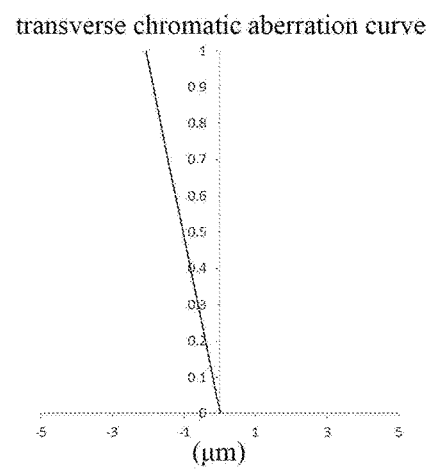
FIG. 14D illustrates a transverse chromatic aberration curve of the camera lens assembly according to Embodiment 7.

FIG. 14A illustrates an axial chromatic aberration curve of the camera lens assembly according to Embodiment 7, representing deviations of focal points of light of different wavelengths converged after passing through an optical system. FIG. 14B illustrates an astigmatism curve of the camera lens assembly according to Embodiment 7, representing a curvature of a meridional image plane and a curvature of a sagittal image plane. FIG. 14C illustrates a distortion curve of the camera lens assembly according to Embodiment 7, representing amounts of distortion at different viewing angles. FIG. 14D illustrates a transverse chromatic aberration curve of the camera lens assembly according to Embodiment 7, representing deviations of different image heights on an image plane after light passes through the camera lens assembly. It can be seen from FIG. 14A to FIG. 14D that the camera lens assembly provided in Embodiment 7 achieves good image quality.

Embodiment 8

Figure 15:
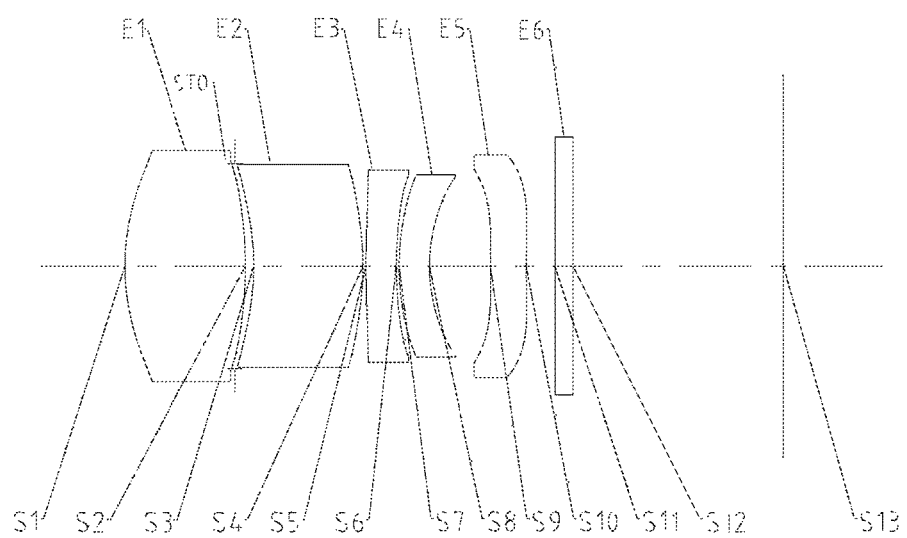
FIG. 15 is a schematic structural diagram of a camera lens assembly according to Embodiment 8.

A camera lens assembly according to Embodiment 8 of the present application is described below with reference to FIG. 15 to FIG. 16D. FIG. 15 is a schematic structural diagram of a camera lens assembly according to Embodiment 8.

As shown in FIG. 15, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 22 shows a surface form, radius of curvature, thickness, material and conic coefficient of each lens in Embodiment 8. Table 23 shows a high-order coefficient of each aspheric mirror surface in Embodiment 8. Table 24 shows the effective focal lengths f1 to f5 of the lenses, the total effective focal length f of the camera lens assembly, and a total track length TTL and a half field-of-view angle HFOV of the camera lens according to Embodiment 8.

TABLE 22

| surface number | surface form | radius of curvature | thickness | material | conic coefficient |
|---|---|---|---|---|---|
| OBJ | spherical | infinite | infinite | | |
| S1 | aspheric | 3.7738 | 2.0079 | 1.544, 56.11 | −0.3964 |
| S2 | aspheric | −6.3280 | −0.1711 | | −20.6045 |
| STO | spherical | infinite | 0.3105 | | 0.0000 |
| S3 | aspheric | −3.8222 | 1.8092 | 1.635, 23.78 | −9.9434 |
| S4 | aspheric | −4.6564 | 0.0500 | | −2.7363 |
| S5 | aspheric | 13.1437 | 0.5000 | 1.635, 23.78 | −33.9820 |
| S6 | aspheric | 5.3974 | 0.0501 | | 9.4116 |
| S7 | aspheric | 4.2015 | 0.5000 | 1.544, 56.11 | 0.4259 |
| S8 | aspheric | 2.5771 | 1.0233 | | 0.5458 |
| S9 | aspheric | 23.8522 | 0.5941 | 1.544, 56.11 | 42.6754 |
| S10 | aspheric | 10.4597 | 0.4760 | | −11.3281 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 23

| surface number | A4 | A6 | A8 | A10 | A12 | A14 | A16 |
|---|---|---|---|---|---|---|---|
| S1 | −1.5212E−03 | −5.0997E−04 | 1.5550E−04 | −1.2077E−04 | 3.5703E−05 | −6.0972E−06 | 4.0346E−07 |
| S2 | −1.0132E−03 | −1.2184E−03 | −1.1650E−04 | −3.1788E−04 | 1.6555E−04 | −2.5045E−05 | 1.0577E−06 |
| S3 | 5.0090E−03 | −1.0779E−03 | −5.2181E−04 | 7.1077E−05 | 4.1448E−06 | 8.8060E−06 | −1.8033E−06 |
| S4 | 1.7860E−02 | −3.6869E−03 | −1.2327E−03 | 5.8449E−04 | −9.7959E−05 | −2.3814E−06 | 3.1267E−06 |
| S5 | −2.1739E−02 | 1.1621E−02 | −3.7536E−03 | 1.3197E−03 | −4.1885E−04 | 5.7095E−06 | 1.7006E−05 |
| S6 | −3.6129E−02 | 1.5193E−02 | −7.8904E−03 | 5.4109E−03 | −1.6636E−03 | 8.6279E−05 | 4.9735E−06 |
| S7 | −1.0505E−02 | 1.3002E−02 | −1.2075E−02 | 5.8943E−03 | −6.7477E−04 | −1.5162E−04 | 3.8727E−06 |
| S8 | −3.8052E−02 | 2.5535E−02 | −1.3024E−02 | 2.5795E−03 | 1.3554E−04 | 2.7251E−04 | −1.2272E−04 |
| S9 | −6.6915E−02 | 6.6915E−03 | 3.9931E−03 | −3.2403E−03 | 5.1320E−04 | 1.4757E−04 | −3.2623E−05 |
| S10 | −5.4883E−02 | 8.4148E−03 | −4.5677E−05 | −9.3561E−04 | 2.4116E−04 | −9.0074E−06 | −3.0960E−06 |

TABLE 24

| | | | |
|---|---|---|---|
| f1(mm) | 4.66 | f(mm) | 10.73 |
| f2(mm) | −217.16 | TTL(mm) | 10.95 |
| f3(mm) | −14.67 | HFOV(deg) | 16.40 |
| f4(mm) | −13.70 | | |
| f5(mm) | −34.67 | | |

Figure 16A:
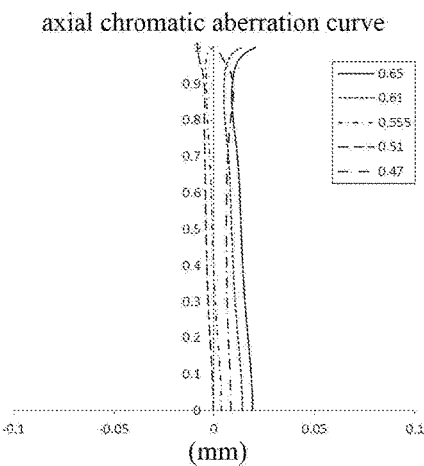
FIG. 16A illustrates an axial chromatic aberration curve of the camera lens assembly according to Embodiment 8.
Figure 16B:
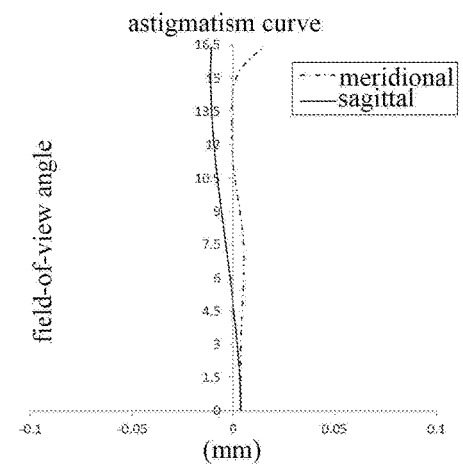
FIG. 16B illustrates an astigmatism curve of the camera lens assembly according to Embodiment 8.
Figure 16C:
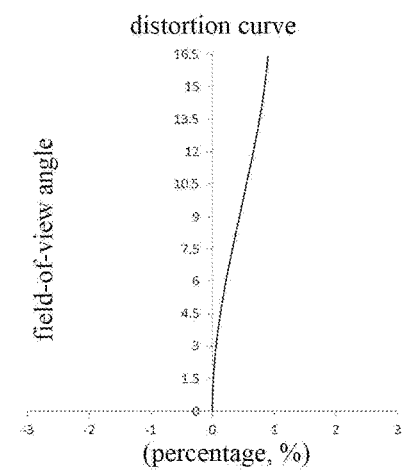
FIG. 16C illustrates a distortion curve of the camera lens assembly according to Embodiment 8.
Figure 16D:
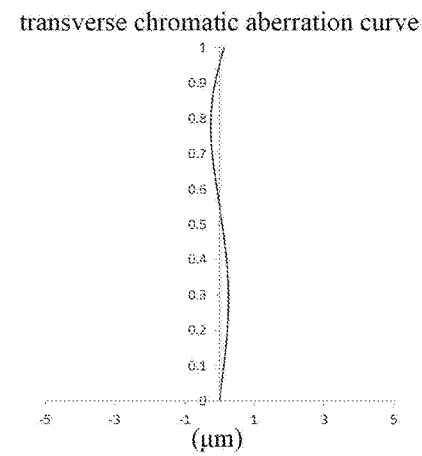
FIG. 16D illustrates a transverse chromatic aberration curve of the camera lens assembly according to Embodiment 8.

FIG. 16A illustrates an axial chromatic aberration curve of the camera lens assembly according to Embodiment 8, representing deviations of focal points of light of different wavelengths converged after passing through an optical system. FIG. 16B illustrates an astigmatism curve of the camera lens assembly according to Embodiment 8, representing a curvature of a meridional image plane and a curvature of a sagittal image plane. FIG. 16C illustrates a distortion curve of the camera lens assembly according to Embodiment 8, representing amounts of distortion at different viewing angles. FIG. 16D illustrates a transverse chromatic aberration curve of the camera lens assembly according to Embodiment 8, representing deviations of different image heights on an image plane after light passes through the camera lens assembly. It can be seen from FIG. 16A to FIG. 16D that the camera lens assembly provided in Embodiment 8 achieves good image quality.

Embodiment 9

Figure 17:
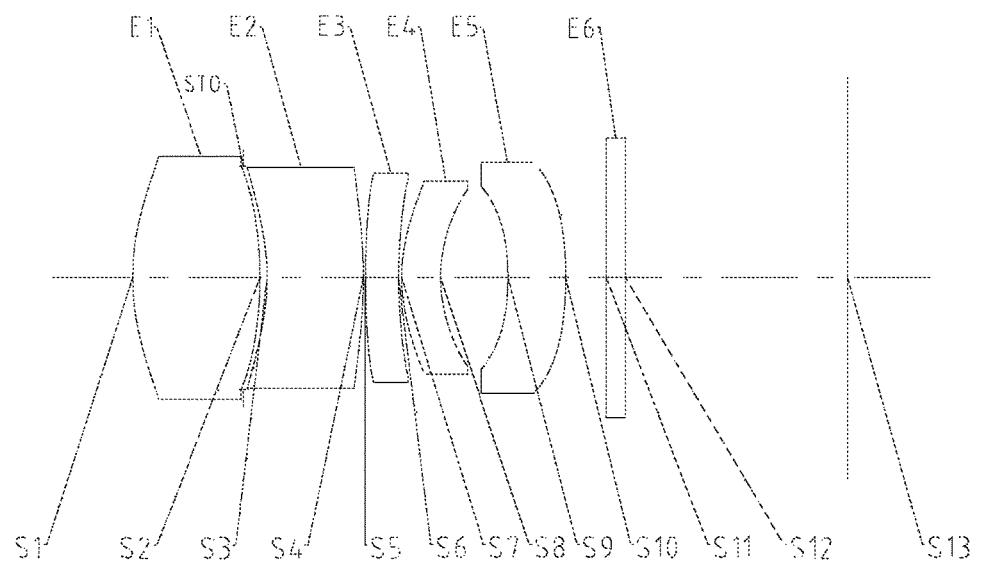
FIG. 17 is a schematic structural diagram of a camera lens assembly according to Embodiment 9.

A camera lens assembly according to Embodiment 9 of the present application is described below with reference to FIG. 17 to FIG. 18D. FIG. 17 is a schematic structural diagram of a camera lens assembly according to Embodiment 9.

As shown in FIG. 17, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 25 shows a surface form, radius of curvature, thickness, material and conic coefficient of each lens in Embodiment 9. Table 26 shows a high-order coefficient of each aspheric mirror surface in Embodiment 9. Table 27 shows the effective focal lengths f1 to f5 of the lenses, the total effective focal length f of the camera lens assembly, and a total track length TTL and a half field-of-view angle HFOV of the camera lens according to Embodiment 9.

TABLE 25

| surface number | surface form | radius of curvature | thickness | material | conic coefficient |
|---|---|---|---|---|---|
| OBJ | spherical | infinite | infinite | | |
| S1 | aspheric | 3.9379 | 2.0083 | 1.544, 56.11 | −0.6447 |
| S2 | aspheric | −5.4615 | −0.2663 | | −22.3613 |
| STO | spherical | infinite | 0.3774 | | 0.0000 |
| S3 | aspheric | −3.3640 | 1.5106 | 1.635, 23.78 | −11.0582 |
| S4 | aspheric | −7.6288 | 0.0300 | | 6.8418 |
| S5 | aspheric | 10.0752 | 0.5212 | 1.544, 56.11 | 17.1535 |
| S6 | aspheric | 7.0419 | 0.0500 | | 8.2965 |
| S7 | aspheric | 2.7148 | 0.6103 | 1.64, 23.53 | −1.7353 |
| S8 | aspheric | 2.2949 | 1.0689 | | 0.2466 |
| S9 | aspheric | −4.0267 | 0.9043 | 1.544, 56.11 | 0.4841 |
| S10 | aspheric | −6.4899 | 0.6372 | | −71.4870 |
| S11 | spherical | infinite | 0.3000 | 1.517, 64.17 | 0.0000 |
| S12 | spherical | infinite | 3.4980 | | 0.0000 |
| S13 | spherical | infinite | | | |

TABLE 26

| surface number | A4 | A6 | A8 | A10 | A12 | A14 | A16 |
|---|---|---|---|---|---|---|---|
| S1 | −1.8771E−03 | −4.8841E−04 | −6.6629E−05 | 1.3384E−07 | −3.2576E−06 | 1.8807E−07 | −7.7397E−09 |
| S2 | −3.1119E−03 | −3.0953E−03 | 2.8250E−04 | −1.9666E−04 | 1.4997E−04 | −3.2795E−05 | 2.1827E−06 |
| S3 | 3.4470E−03 | −1.4973E−03 | −3.4925E−04 | 1.4050E−04 | 2.2985E−06 | 2.7342E−06 | −1.1490E−06 |
| S4 | 1.0132E−02 | 6.9199E−04 | −1.3641E−03 | 4.1317E−04 | −2.3237E−05 | −1.3910E−06 | −3.4251E−07 |
| S5 | −1.3933E−02 | 6.8995E−03 | −4.3349E−03 | 1.7354E−03 | −2.2289E−04 | 7.1091E−06 | 6.5715E−07 |
| S6 | −1.6882E−02 | 9.8896E−03 | −1.1314E−02 | 6.1105E−03 | −1.0501E−03 | −8.3360E−05 | 3.8737E−05 |
| S7 | −1.9367E−02 | 1.3273E−02 | −1.0352E−02 | 5.0269E−03 | −1.2062E−03 | 1.4597E−04 | −1.4536E−05 |
| S8 | −3.3707E−02 | 1.2763E−02 | −4.2170E−03 | 1.7287E−03 | −1.0298E−03 | 5.9551E−04 | −1.2040E−04 |
| S9 | −3.1994E−02 | −3.0799E−03 | 5.0228E−03 | −4.6327E−03 | 2.1611E−03 | −5.4839E−04 | 6.2389E−05 |
| S10 | −5.0958E−02 | 2.1064E−02 | −1.2738E−02 | 5.7701E−03 | −1.7896E−03 | 3.2127E−04 | −2.5729E−05 |

TABLE 27

| | | | |
|---|---|---|---|
| f1(mm) | 4.53 | f(mm) | 10.80 |
| f2(mm) | −10.91 | TTL(mm) | 11.25 |
| f3(mm) | −45.61 | HFOV(deg) | 16.29 |
| f4(mm) | −53.49 | | |
| f5(mm) | −22.33 | | |

Figure 18A:
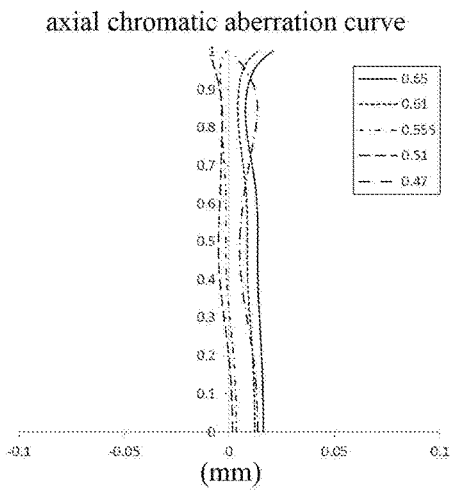
FIG. 18A illustrates an axial chromatic aberration curve of the camera lens assembly according to Embodiment 9.
Figure 18B:
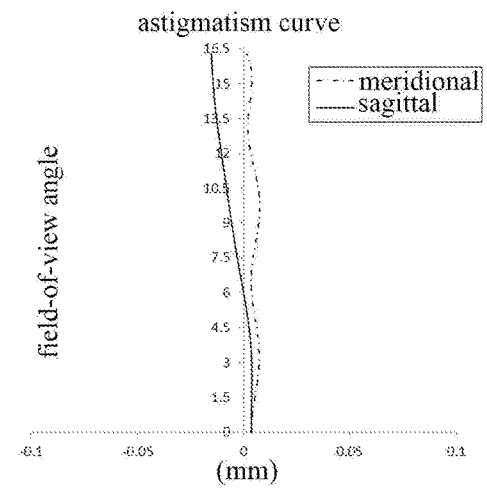
FIG. 18B illustrates an astigmatism curve of the camera lens assembly according to Embodiment 9.
Figure 18C:
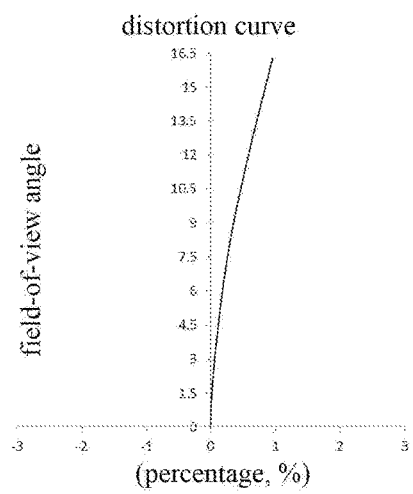
FIG. 18C illustrates a distortion curve of the camera lens assembly according to Embodiment 9.
Figure 18D:
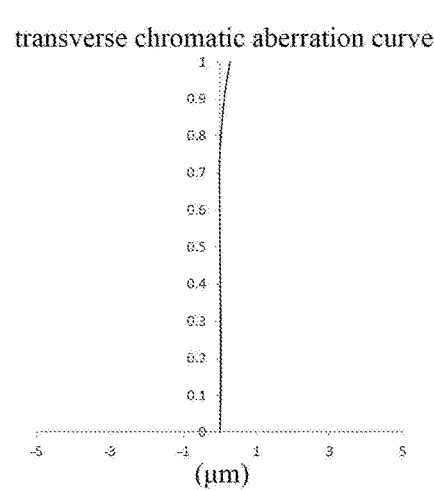
FIG. 18D illustrates a transverse chromatic aberration curve of the camera lens assembly according to Embodiment 9.

FIG. 18A illustrates an axial chromatic aberration curve of the camera lens assembly according to Embodiment 9, representing deviations of focal points of light of different wavelengths converged after passing through an optical system. FIG. 18B illustrates an astigmatism curve of the camera lens assembly according to Embodiment 9, representing a curvature of a meridional image plane and a curvature of a sagittal image plane. FIG. 18C illustrates a distortion curve of the camera lens assembly according to Embodiment 9, representing amounts of distortion at different viewing angles. FIG. 18D illustrates a transverse chromatic aberration curve of the camera lens assembly according to Embodiment 9, representing deviations of different image heights on an image plane after light passes through the camera lens assembly. It can be seen from FIG. 18A to FIG. 18D that the camera lens assembly provided in Embodiment 9 achieves good image quality.

Embodiment 10

Figure 19:
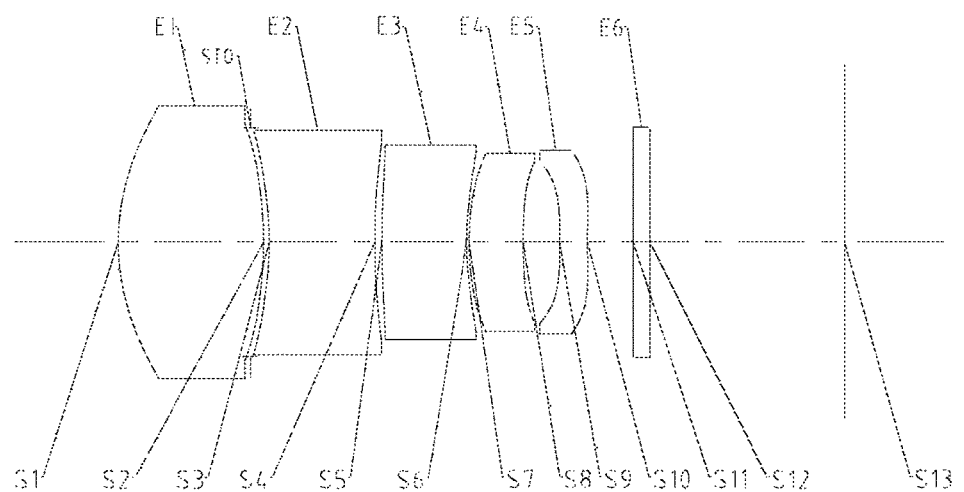
FIG. 19 is a schematic structural diagram of a camera lens assembly according to Embodiment 10.

A camera lens assembly according to Embodiment 10 of the present application is described below with reference to FIG. 19 to FIG. 20D. FIG. 19 is a schematic structural diagram of a camera lens assembly according to Embodiment 10.

As shown in FIG. 19, the camera lens assembly includes five lenses E1-E5 arranged in sequence from an object side to an image side. The first lens E1 has an object-side surface S1 and an image-side surface S2; the second lens E2 has an object-side surface S3 and an image-side surface S4; the third lens E3 has an object-side surface S5 and an image-side surface S6; the fourth lens E4 has an object-side surface S7 and an image-side surface S8; and the fifth lens E5 has an object-side surface S9 and an image-side surface S10. Optionally, the camera lens assembly may further include a filter E6 having an object-side surface S11 and an image-side surface S12 and used for filtering off infrared light. In the camera lens assembly of this embodiment, an aperture STO may further be disposed to adjust the amount of light admitted. Light from an object sequentially passes through the surfaces S1 to S12 and finally forms an image on the image plane S13.

Table 28 shows a surface form, radius of curvature, thickness, material and conic coefficient of each lens in Embodiment 10. Table 29 shows a high-order coefficient of each aspheric mirror surface in Embodiment 10. Table 30 shows the effective focal lengths f1 to f5 of the lenses, the total effective focal length f of the camera lens assembly, and a total track length TTL and a half field-of-view angle HFOV of the camera lens according to Embodiment 10.

TABLE 28

| surface number | surface form | radius of curvature | thickness | material | conic coefficient |
|---|---|---|---|---|---|
| OBJ | spherical | infinite | infinite | | |
| S1 | aspheric | 4.1477 | 2.6144 | 1.544, 56.11 | 0.1580 |
| S2 | aspheric | −5.9987 | −0.2325 | | −29.6425 |
| STO | spherical | infinite | 0.3325 | | 0.0000 |
| S3 | aspheric | −5.2118 | 1.8942 | 1.614, 25.57 | −21.0528 |
| S4 | aspheric | 25.1448 | 0.1230 | | 50.0000 |
| S5 | aspheric | 16.6583 | 1.5258 | 1.544, 56.11 | 48.1168 |
| S6 | aspheric | 4.6794 | 0.0500 | | −15.2911 |
| S7 | aspheric | 5.2488 | 0.9648 | 1.64, 23.53 | 5.5509 |
| S8 | aspheric | 9.8290 | 0.6537 | | 33.7988 |
| S9 | aspheric | −389.0308 | 0.5000 | 1.544, 56.11 | 50.0000 |
| S10 | aspheric | 10.5615 | 0.8179 | | −99.0000 |
| S11 | spherical | infinite | 0.3000 | 1.517, 64.17 | 0.0000 |
| S12 | spherical | infinite | 3.5000 | | 0.0000 |
| S13 | spherical | infinite | | | |

TABLE 29

| surface number | A4 | A6 | A8 | A10 | A12 | A14 | A16 |
|---|---|---|---|---|---|---|---|
| S1 | −1.4754E−03 | 2.3626E−04 | −3.4461E−04 | 1.6098E−04 | −3.9922E−05 | 4.8869E−06 | −2.4097E−07 |
| S2 | 4.0416E−04 | −5.8217E−04 | −3.5035E−04 | −9.8534E−05 | 8.0406E−05 | −1.3829E−05 | 7.3027E−07 |
| S3 | 6.7161E−03 | −1.8533E−03 | −4.6548E−04 | 1.2292E−04 | −3.3881E−06 | 1.9591E−06 | −4.8325E−07 |
| S4 | 1.5860E−02 | −1.1773E−03 | −2.3628E−03 | 5.6540E−04 | 2.2069E−05 | −5.8629E−06 | −1.8014E−06 |
| S5 | −5.9676E−03 | 5.0134E−03 | −4.2143E−03 | 1.3892E−03 | −2.2000E−04 | 2.5683E−05 | −2.6593E−06 |
| S6 | −2.2581E−02 | 1.6987E−02 | −1.1098E−02 | 5.2788E−03 | −9.6137E−04 | −1.2175E−04 | 4.2987E−05 |
| S7 | −8.0452E−03 | 1.3644E−02 | −1.0632E−02 | 4.9668E−03 | −1.2555E−03 | 1.4672E−04 | −1.1778E−05 |
| S8 | 8.3143E−03 | 6.7257E−03 | −2.4391E−03 | 3.6084E−04 | −8.5353E−04 | 6.1697E−04 | −9.5954E−05 |
| S9 | −9.8992E−02 | 1.1251E−02 | 8.4825E−03 | −7.9997E−03 | 1.2437E−03 | 3.7979E−04 | −6.4744E−05 |
| S10 | −7.6856E−02 | 1.9729E−02 | −6.2136E−03 | 2.6648E−03 | −1.6545E−03 | 5.6802E−04 | −7.3835E−05 |

TABLE 30

| f1(mm) | 4.94 | f(mm) | 13.46 |
|---|---|---|---|
| f2(mm) | −6.82 | TTL(mm) | 13.04 |
| f3(mm) | −12.48 | HFOV(deg) | 13.09 |
| f4(mm) | 16.14 | | |
| f5(mm) | −18.83 | | |

Figure 20A:
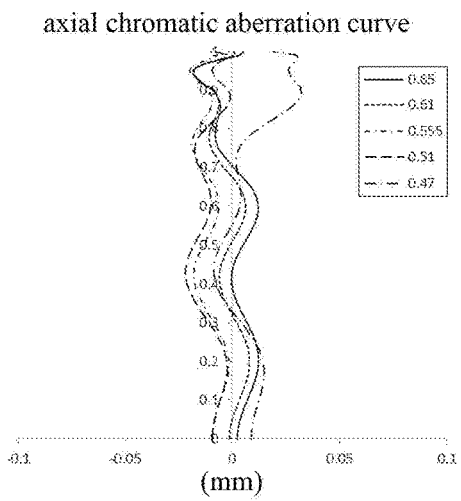
FIG. 20A illustrates an axial chromatic aberration curve of the camera lens assembly according to Embodiment 10.
Figure 20B:
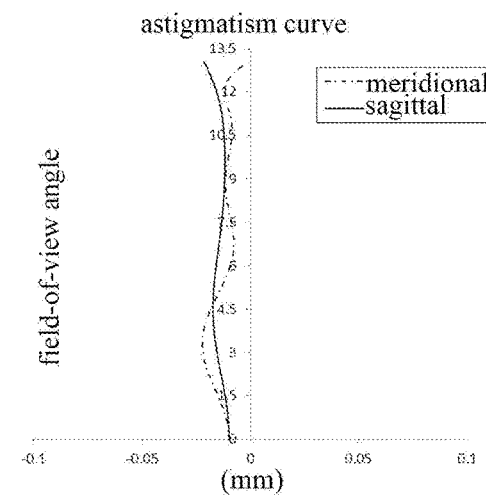
FIG. 20B illustrates an astigmatism curve of the camera lens assembly according to Embodiment 10.
Figure 20C:
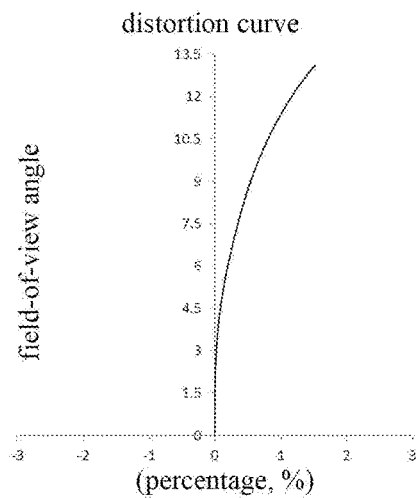
FIG. 20C illustrates a distortion curve of the camera lens assembly according to Embodiment 10.
Figure 20D:
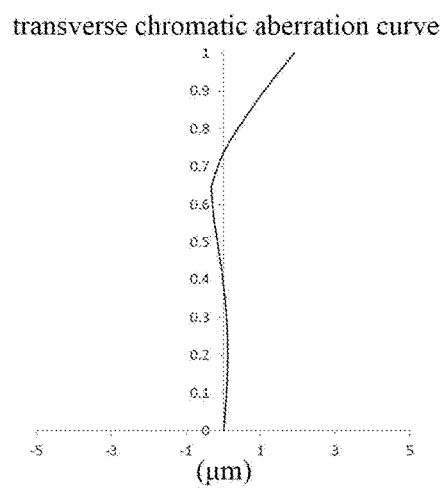
FIG. 20D illustrates a transverse chromatic aberration curve of the camera lens assembly according to Embodiment 10.

FIG. 20A illustrates an axial chromatic aberration curve of the camera lens assembly according to Embodiment 10, representing deviations of focal points of light of different wavelengths converged after passing through an optical system. FIG. 20B illustrates an astigmatism curve of the camera lens assembly according to Embodiment 10, representing a curvature of a meridional image plane and a curvature of a sagittal image plane. FIG. 20C illustrates a distortion curve of the camera lens assembly according to Embodiment 10, representing amounts of distortion at different viewing angles. FIG. 20D illustrates a transverse chromatic aberration curve of the camera lens assembly according to Embodiment 10, representing deviations of different image heights on an image plane after light passes through the camera lens assembly. It can be seen from FIG. 20A to FIG. 20D that the camera lens assembly provided in Embodiment 10 achieves good image quality.

To sum up, Embodiment 1 to Embodiment 10 respectively satisfy the relations shown in Table 31 below.

TABLE 31

| Condition | Embodiment | | | | | | | | | |
|---|---|---|---|---|---|---|---|---|---|---|
| | 1 | 2 | 3 | 4 | 5 | 6 | 7 | 8 | 9 | 10 |
| f/f1 | 2.44 | 2.31 | 2.23 | 2.37 | 2.40 | 2.98 | 2.01 | 2.30 | 2.38 | 2.72 |
| T45/(T12 + T23 + T34) | 1.02 | 4.31 | 3.33 | 4.39 | 2.05 | 3.33 | 3.33 | 2.79 | 3.70 | 0.81 |
| SD11/SD52 | 1.04 | 1.04 | 1.04 | 1.04 | 1.04 | 1.11 | 1.11 | 1.04 | 1.05 | 1.48 |
| ImgH/f | 0.30 | 0.29 | 0.29 | 0.29 | 0.30 | 0.30 | 0.30 | 0.30 | 0.29 | 0.24 |
| f1/f2 | −0.64 | −0.31 | −0.37 | −0.36 | −0.37 | −0.68 | −0.37 | −0.02 | −0.42 | −0.72 |
| f1/f5 | −0.20 | −0.17 | −0.17 | −0.21 | −0.14 | −0.18 | −0.42 | −0.13 | −0.20 | −0.26 |
| CT1/CT2 | 1.56 | 1.58 | 1.82 | 1.18 | 1.76 | 1.40 | 1.03 | 1.11 | 1.33 | 1.38 |
| CT5/(CT3 + CT4) | 0.47 | 0.38 | 0.32 | 0.59 | 0.41 | 0.44 | 0.35 | 0.59 | 0.80 | 0.20 |
| (V2 + V3 + V4)/3 | 34.39 | 34.47 | 34.47 | 34.47 | 34.56 | 35.07 | 35.07 | 34.56 | 34.47 | 35.07 |
| R1/R2 | −0.61 | −0.93 | −0.81 | −0.79 | −0.85 | −1.40 | −0.56 | −0.60 | −0.72 | −0.69 |

The present application further provides a camera device, having a photosensitive element which may be a photosensitive charge-coupled device (CCD) or complementary metal-oxide semiconductor (CMOS) element. The camera device may be an independent camera device such as a digital camera, or may be a camera module integrated in a mobile electronic device such as a mobile phone. The camera device is equipped with the camera lens assembly described above.

Figure 21:
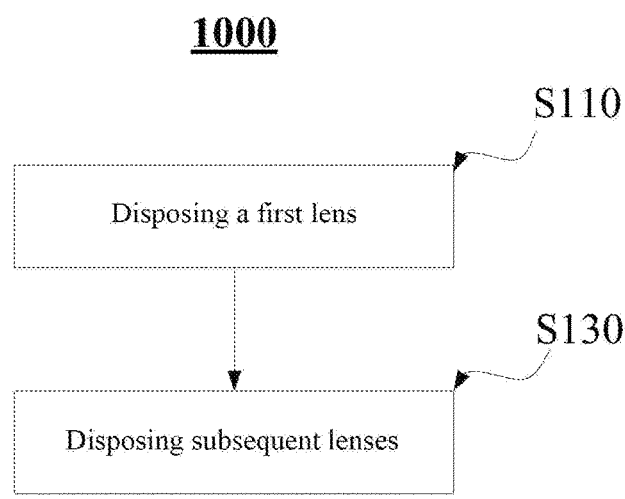
FIG. 21 illustrates a method for forming a camera lens assembly according to the present application.

FIG. 21 illustrates a method 1000 for forming a camera lens assembly according to the present application. The method for forming a camera lens assembly includes: S110, disposing a first lens having positive focal power starting from an object side; and step S130, disposing in sequence multiple subsequent lenses from the first lens to an image side along an optical axis to receive an optical signal from the first lens, where the focal power of the first lens satisfies the following formula: 2.0<f/f1<3.0, where f is a total effective focal length jointly determined by the first lens and the multiple subsequent lenses, and f1 is an effective focal length of the first lens.

According to this implementation, the total effective focal length f and ImgH, ImgH being half a diagonal length of an effective pixel area of a photosensitive component, satisfy the following formula: ImgH/f<0.35, for example, ImgH/f0.30, where the photosensitive component is disposed on an image plane jointly determined by the first lens and the multiple subsequent lenses.

According to an implementation of the present application, the multiple subsequent lenses include a second lens, a third lens, a fourth lens, and a fifth lens arranged in sequence from the first lens to the image side, where the second lens has negative focal power and an object-side surface of the second lens is a concave surface; an image-side surface of the fourth lens is a concave surface; and the fifth lens has negative focal power. In addition, an object-side surface of the third lens is a convex surface and an image-side surface of the third lens is a concave surface. Moreover, an object-side surface of the fourth lens is a convex surface.

According to this implementation, the method further includes: setting, on the optical axis, an air spacing T12 between the first lens and the second lens, an air spacing T23 between the second lens and the third lens, an air spacing T34 between the third lens and the fourth lens, and an air spacing T45 between the fourth lens and the fifth lens in such a manner that 0.8≤T45/(T12+T23+T34)<4.5, for example, 0.81≤T45/(T12+T23+T34)≤4.39.

According to this implementation, the method further includes: setting a maximum effective radius SD11 of an object-side surface of the first lens and a maximum effective radius SD52 of an image-side surface of the fifth lens in such a manner that 1≤SD11/SD52<1.5, for example, 1.04≤SD11/SD52≤1.48.

According to this implementation, the method further includes: setting an effective focal length f2 of the second lens in such a manner that −1.0<f1/f2<0, for example, −0.72f1/f2≤−0.02.

According to this implementation, the method further includes: setting an effective focal length f5 of the fifth lens in such a manner that −0.5<f1/f5<0, for example, −0.42f1/f5≤−0.13.

According to this implementation, the method further includes: setting a center thickness CT1 of the first lens and a center thickness CT2 of the second lens in such a manner that 1<CT1/CT2<2, for example, 1.03≤CT1/CT2≤1.82.

According to this implementation, the method further includes: setting a center thickness CT3 of the third lens, a center thickness CT4 of the fourth lens, and a center thickness CT5 of the fifth lens in such a manner that 0.2≤CT5/(CT3+CT4)<1.0, for example, 0.20≤CT5/(CT3+CT4)≤0.80.

According to this implementation, the method further includes: setting a dispersion coefficient V2 of the second lens, a dispersion coefficient V3 of the third lens, and a dispersion coefficient V4 of the fourth lens in such a manner that 30<(V2+V3+V4)/3<40, for example, 34.39≤(V2+V3+V4)/3≤35.07.

According to this implementation, the method further includes: setting a radius of curvature R1 of an object-side surface of the first lens and a radius of curvature R2 of an image-side surface of the second lens in such a manner that −1.5<R1/R2<−0.5, for example, −1.40≤R1/R2≤−0.56.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A camera lens assembly, comprising a first lens adjacent to an object side and having positive optical power and multiple subsequent lenses arranged in sequence from the first lens to an image side along an optical axis, wherein the optical power of the first lens satisfies the following formula:

$$2.0<f/f1<3.0,$$

wherein f is a total effective focal length jointly determined by the first lens and the multiple subsequent lenses, and f1 is an effective focal length of the first lens;

wherein the total effective focal length f and ImgH, ImgH being half a diagonal length of an effective pixel area of a photosensitive component, satisfy the following formula:

ImgH/f<0.35, wherein the photosensitive component is disposed on an image plane jointly determined by the first lens and the multiple subsequent lenses.

2. The camera lens assembly according to claim 1, wherein the multiple subsequent lenses comprise a second lens, a third lens, a fourth lens, and a fifth lens arranged in sequence from the first lens to the image side, wherein
the second lens has negative optical power and an object-side surface of the second lens is a concave surface;
an image-side surface of the fourth lens is a concave surface; and
the fifth lens has negative optical power.

3. The camera lens assembly according to claim 2, wherein on the optical axis, an air spacing T12 between the first lens and the second lens, an air spacing T23 between the second lens and the third lens, an air spacing T34 between the third lens and the fourth lens, and an air spacing T45 between the fourth lens and the fifth lens satisfy: 0.8<T45/(T12+T23+T34)<4.5.

4. The camera lens assembly according to claim 2, wherein a maximum effective radius SD11 of an object-side surface of the first lens and a maximum effective radius SD52 of an image-side surface of the fifth lens satisfy: 1≤SD11/SD52<1.5.

5. The camera lens assembly according to claim 2, wherein an effective focal length f2 of the second lens satisfies: −1.0<f1/f2<0.

6. The camera lens assembly according to claim 2, wherein an effective focal length f5 of the fifth lens satisfies: −0.5<f1/f5<0.

7. The camera lens assembly according to claim 2, wherein a center thickness CT1 of the first lens and a center thickness CT2 of the second lens satisfy: 1<CT1/CT2<2.

8. The camera lens assembly according to claim 2, wherein a center thickness CT3 of the third lens, a center thickness CT4 of the fourth lens, and a center thickness CT5 of the fifth lens satisfy: 0.2≤CT5/(CT3+CT4)<1.0.

9. The camera lens assembly according to claim 2, wherein a dispersion coefficient V2 of the second lens, a dispersion coefficient V3 of the third lens, and a dispersion coefficient V4 of the fourth lens satisfy: 30<(V2+V3+V4)/3<40.

10. The camera lens assembly according to claim 2, wherein a radius of curvature R1 of an object-side surface of the first lens and a radius of curvature R2 of an image-side surface of the second lens satisfy: −1.5<R1/R2<−0.5.

11. The camera lens assembly according to claim 2, wherein an object-side surface of the third lens is a convex surface and an image-side surface of the third lens is a concave surface.

12. The camera lens assembly according to claim 2, wherein an object-side surface of the fourth lens is a convex surface.

13. A camera device, equipped with a camera lens assembly, the camera lens assembly comprising a first lens adjacent to an object side and having positive optical power and multiple subsequent lenses arranged in sequence from the first lens to an image side along an optical axis, wherein the optical power of the first lens satisfies the following formula:

$$2.0<f/f1<3.0,$$

wherein f is a total effective focal length jointly determined by the first lens and the multiple subsequent lenses, and f1 is an effective focal length of the first lens;

wherein the total effective focal length f and ImgH, ImgH being half a diagonal length of an effective pixel area of a photosensitive component, satisfy the following formula:

ImgH/f<0.35, wherein the photosensitive component is disposed on an image plane jointly determined by the first lens and the multiple subsequent lenses.

14. A method for forming a camera lens assembly, comprising:
disposing a first lens having positive optical power starting from an object side; and
disposing in sequence multiple subsequent lenses from the first lens to an image side along an optical axis, wherein the optical power of the first lens satisfies the following formula:

$$2.0<f/f1<3.0,$$

wherein f is a total effective focal length jointly determined by the first lens and the multiple subsequent lenses, and f1 is an effective focal length of the first lens;

wherein the total effective focal length f and ImgH, ImgH being half a diagonal length of an effective pixel area of a photosensitive component, satisfy the following formula:

ImgH/f<0.35, wherein the photosensitive component is disposed on an image plane jointly determined by the first lens and the multiple subsequent lenses.

* * * * *